United States Patent [19]
Mintz

[11] Patent Number: 5,532,702
[45] Date of Patent: Jul. 2, 1996

[54] METHOD AND SYSTEM FOR OBTAINING INFORMATION FROM A PLURALITY OF REMOTE STATIONS

[76] Inventor: Yosef Mintz, 14 Savyon Street, Petach Tikva 49542, Israel

[21] Appl. No.: 232,776

[22] Filed: Apr. 25, 1994

Related U.S. Application Data

[63] Continuation-in-part of PCT/EP93/03418, filed Dec. 6, 1993.

[30] Foreign Application Priority Data

Dec. 4, 1992 [IL] Israel ......................................... 103976

[51] Int. Cl.$^6$ .................................................. G01S 3/02
[52] U.S. Cl. .................................................... 342/463
[58] Field of Search .................................... 342/463, 458, 342/387, 457

[56] References Cited

FOREIGN PATENT DOCUMENTS 8903106  4/1989  WIPO.

OTHER PUBLICATIONS

Patent Abstracts of Japan vol. 8, No. 70, 3 Apr. 1984.
Patent Abstracts of Japan vol. 10, No. 275, 18 Sept. 1986.
Patent Abstracts of Japan vol. 9, No. 193, 9 Aug. 1985.
Patent Abstracts of Japan vol. 9, No. 197, 14 Aug. 1985.

*Primary Examiner*—Gregory C. Issing
*Attorney, Agent, or Firm*—Ladas & Parry

[57] ABSTRACT

A method for receiving information from a plurality of remote stations, the stations having varying attributes related to the information, comprising the steps of:

(a) determining, at each of the stations, of a characteristic according to a predetermined protocol for the respective station in response to the call; and (b) transmitting, by the stations, of a non-information bearing signal at a predetermined time and frequency slot, wherein said slot is indicative of the determined characteristic.

40 Claims, 16 Drawing Sheets

METHOD AND SYSTEM FOR OBTAINING INFORMATION FROM A PLURALITY OF REMOTE STATIONS

RELATED APPLICATIONS

This application is a continuation in part of PCT application EP93/03418, filed Dec. 6, 1993 which designates the United States.

FIELD OF THE INVENTION

This invention relates generally to a method and system for obtaining information from a plurality of remote stations.

BACKGROUND OF THE INVENTION

It is a common requirement to target and possibly identify quickly one or several out of a plurality of participants according to specific selection criteria.

It is frequently required to select one or more participants according to their priority based on specified selection criteria for the purpose of allocating a particular task to the participant or participants having the highest priority.

In dispatching systems, for example, for dispatching a taxi or messenger to a customer at a specified location, it is desirable that a suitable (and preferably the most suitable) taxi or messenger be sent to a particular customer. Generally the nearest, unoccupied taxi which has sufficient accommodation should be dispatched to the customer. Furthermore, it is desirable that the allocation be accomplished in the minimum possible time.

Typical existing dispatching systems include a central dispatch station having a transmitter and receiver and a transceiver in each of the participating vehicles for communicating with the central dispatch station. Typically, a voice request is transmitted by a dispatcher to each of the participating vehicles, and the dispatcher decides which of the vehicles is most suited to the task in hand based on the replies from the vehicles.

Such a system would be capable of simple implementation if the selection criteria related to static variables only. Thus, if the only selection criterion were a taxi's current distance from the customer and each taxi were stationary, it would merely be necessary to extract the taxis' locations once, after which it would be simple to determine which taxi were nearest to the customer's location. However, in practice, the selection criteria relate to dynamic variables which, by definition, are changing constantly and therefore it is necessary continuously to update each taxi's distance from the customer's location (and/or other information required to choose a taxi for the given task) or at least to do so each time a taxi is to be dispatched.

In typical prior art systems, this is done by providing the dispatcher with a periodically updated map that shows the respective location of each of the taxis. This updating is accomplished by the periodic transmission of a location message by each of the taxis via a communication channel. In order to ensure that the transmitted data can be received quickly and without corruption, the total spectrum width of the communication system must be very large.

In a system described in EP 038988 job requests are dispatched by a controller to mobile vehicles which messages include information about the location of a job. Each vehicle has a receiver, transmitter and circuitry to compare the requirements of the job with the status of the vehicle. If the results of the comparison is that the vehicle is suitable for the job, then it transmits a message back to the controller volunteering itself for the job.

It should also be noted that, even in the specific case of a taxi or messenger service, distance from the customer location is by no means the only criterion according to which a task may be allocated. Thus, it may well be that the nearest messenger or taxi is already occupied and is therefore not available for performing the task. Alternatively, the nearest available taxi may not have sufficient room for carrying all the passengers to whom a taxi must be sent; or perhaps a particularly bulky load must be carried and the nearest, available taxi or messenger is inadequate for the task.

Yet a further consideration is that it is often preferred to dispatch to a customer an idle taxi waiting at the taxi rank rather than go through the process of transmitting a voice message and awaiting responses from taxis in the field prior to allocating the task to one of them. In the event that several idle taxis are waiting at the taxi rank, or where several taxis are reasonably close to the customer, it is often preferable that the taxi which has been idle for the longest period of time be selected.

Furthermore, it may not always be desirable to dispatch the nearest available taxi to a particular customer location if other customers, albeit further away, have made prior requests which have not yet been serviced.

Even apart from some of the basic limitations of prior art systems described above, it is often desirable to target and possibly to identify participants according to several selection criteria. This is somewhat analogous to performing a database search by means of key words which can be combined according to the rules of Boolean or other logic systems. However, database records are generally static and are stored at a single location. In contrast to this, the participants subject of the invention are dynamic and constantly changing, and cannot be characterized by static data which can be stored at a single site. Thus, if the dynamic data characterizing such participants are to be searched at a single site, then the data must first be downloaded to the site where the search is to be performed. During the time that such data are downloaded, they may well change, thereby compromising the accuracy of the search which is subsequently performed.

Another application which requires the receiving and processing of information from a large number of sources is IVHS. In this application, for example, information on position and speed from a large number of vehicles is processed in order to obtain information on road delays. Again, the sending of large amounts of information requires substantial bandwidths, even though the vehicles themselves need not be identified.

SUMMARY OF THE INVENTION

It is an object of some aspects of the present invention to transmit information from a plurality of remote sources without requiring that each of the transmissions be on a separate time/frequency channel.

It is an object of some aspects of the invention to provide a method of transmitting information from a plurality of remote stations wherein the information is contained in the presence or absence of a signal in a particular time and/or frequency slot and not in the identification of the particular station which transmits the information or in how many stations transmit signals in the slot.

It is an object of some aspects of the invention to provide a method and system for determining priorities of a plurality of participants in accordance with one or more selection criteria and targeting those participants, if any, having the highest priority.

It is a further object of some aspects of the invention to provide such a method and system wherein those participants having the highest priority can be targeted in a short time.

Yet a further object of some aspects of the invention is to provide such a method and system wherein at least one of the targeted participants can be identified in order that a task can be allocated thereto.

It is an object of some aspects of the present invention to provide a method of determining delays in a road network based on transmissions from a large number of vehicles without identifying the vehicles and without clearly receiving the information.

As used herein the term "priority" means, in addition to its normal meaning, a characterization according to a protocol which takes into consideration one or more elements associated with a person or object being characterized.

According to a broad aspect of the invention a call is broadcast or otherwise transmitted to a plurality of remote stations. Each of the plurality of stations determines a characteristic based on certain predetermined attributes of the station and broadcasts or transmits an indication signal during a communication slot which is indicative of the characteristic, or preferably of a range of values of the characteristic. In general, more than one remote station will broadcast at the same time and frequency during at least a portion of the process.

In one embodiment of the invention, all of the stations broadcast or transmit at the same frequency, i.e., all of the slots have the same frequency and the time of the slot is determined by the characteristic. In a second embodiment of the invention, more than one frequency is used for communication and both the time and frequency indicate the value of the characteristic. In a third embodiment of the invention, all of the stations transmit at the same time, and the characteristic is indicated by the frequency of transmission only.

It should be understood that since more than one indication signal may be broadcast or transmitted at the same time and frequency, there is no identification of the responding stations, but only an indication of the characteristics (or rather ranges of characteristics, since each time/frequency "slot" characterize a range of priorities) which characterize at least one remote station.

It should also be understood that in preferred embodiments of the invention, the transmitted information signals are "non-information bearing signals" in that the signals per se carry no information, only the slot in which the signal occurs carries information.

According to one aspect of the invention the characteristics are one or more priorities associated with the stations.

In one aspect of the invention a control center monitors the transmissions of the remote stations and determines which of the slots having an indication signal has the highest priority. It is convenient to order the response time period into time (or time/frequency) slots each representing a range of priority values preferably in descending order of priorities. Thus, the control center need only look for the earliest slot which contains an indication signal.

Having determined the highest range of priorities which are held by at least one remote station, a second call is broadcast or otherwise transmitted asking for responses only from those remote units within this range. The time or time/frequency slots are now distributed, either by a predetermined protocol or specifically by the particular call, so as to cover this range of priority values.

The stations which have priorities within this range broadcast or otherwise transmit indication signals in response to the new call in the predetermined time or time/frequency slots. This process of determining the highest range of priorities and redividing the range continues until a given criteria is met. This stage of the process often termed herein the "targeting phase," (sometimes referred to herein as the "first phase" or "phase one") ends when the priority range ceases to be significant or the number of sub-ranges which are filled falls below a predetermined number based on the statistics of the total number of participating remote stations and the final range or priorities or where some other predetermined criteria is reached. At this point the number of station which are responding to the highest priority is believed to be small.

Before going on to the next stage it may be useful to estimate the number of stations which have responded to the highest priority. One method of making the estimate is by analysis of the data from the final step of phase one. A more accurate method of estimating the number of stations having the highest priority is to request each of these stations to transmit an indication signal at a randomly chosen slot over at least a portion of the entire range of time and frequency slots. Since the number of slots is now expected to be large compared to the number of stations, the number of slots which have information is a good indication of the number of stations. If fewer stations are expected, only a single time slot may be used and only the frequency is chosen randomly by the stations.

The system then preferably initiates an "identification phase" (sometimes referred to herein as "second phase" or "phase two") starting with the broadcast or other transmission of an additional call requesting those stations within the highest (final) range of priorities found in the targeting phase to identify themselves. Each of the stations having a priority in this range broadcasts or otherwise transmits a signal including an identifier of the station or some other message at a slot which it chooses at random from one of a plurality of such available slots. If only one station is expected to be within the range of priority values, then only one identification slot may be allocated. Other types of slots can also be used for the identification stage, such as coded spread spectrum signals, FDMA or CDMA. Additionally, multiple slots may be used for the same priority range to improve the reliability of detection in both the targeting and identification stages. The identification slots generally have an information carrying capacity which is larger than the slots used for indicating priorities since information (and not only an indication of the presence of a signal) is transmitted during the identification phase.

Since, when a plurality of remote stations are within the final range of values, it can be expected that more than one of the stations will respond in at least some of the slots, in which case their identification signal may be unintelligible. However, since the number of stations is relatively small, at least some of the slots will have only one identification signal. In general, the station having this signal is chosen since at this stage the difference in priority between the stations is generally unimportant. In some applications more than one identification signal may be broadcast in a particular slot, however, one signal may be clear. This station will then be chosen.

In another aspect of the invention the indication signal depends on the average velocity or delay of the remote station, which are generally vehicles. Systems which operate according to this aspect of the invention preferably broadcast a call to the remote stations which requests those stations having a delay above a given value or an average velocity below a given value to broadcast a signal indicative of their position. Such signals are then used to generate a map of those regions for which traffic is delayed or otherwise moving slowly.

Preferably, an additional call is sent to the vehicles requesting transmission of indication signals which position the slow moving or delayed vehicles at a higher resolution than that of the first call. Further calls may be made to allow for transmission of additional information on the status of the vehicles to provide further characterization of the delays.

In general, one or more base stations may be used for broadcasting calls and/or receiving responses from remote stations. If more than one base station is used, each station preferably performs a reduction of the data which it receives by either choosing its best candidate for performing the task or by performing a mapping function of its nearby region or of its associated vehicles. The base stations then preferably send this reduced information to a central base station which makes the final decision, constructs the desired map or performs any other final analysis. Furthermore, the central base station would, in a preferred embodiment of the invention, instruct each of the base stations as to which additional queries they should make. In this situation the subsequent queries need not be the same for all the base stations.

There is thus provided, in accordance with a preferred embodiment of the invention, a method for receiving information from a plurality of remote stations, the stations having varying attributes related to the information, comprising the steps of:

(a) determining, at each of the stations, of a characteristic value based on at least one of the attributes, according to a predetermined protocol for the respective station; and (b) transmitting, by the stations, of a non-information bearing signal in a transmission slot, wherein said slot is indicative of the determined characteristic.

There is further provided in accordance with a preferred embodiment of the invention, a method for receiving information from a plurality of remote stations, the stations having varying attributes related to the information, comprising the steps of:

(a) determining, at each of the stations, of a characteristic value based on at least one of the attributes according to a predetermined protocol for the respective station; and (b) transmitting, by the stations, of a signal in a transmission slot, wherein said slot is indicative of the determined characteristic value and wherein signals are intentionally transmitted by more than one station in a given transmission slot.

Preferably, the steps of determining and transmitting are in response to a call transmitted to the plurality of stations.

BRIEF DESCRIPTION OF THE DRAWINGS

In order to better understand the invention and to see how the same may be carried out in practice, non-limiting preferred embodiments of the invention will now be described with reference to the accompanying drawings, in which.

DETAILED DESCRIPTION OF A PREFERRED EMBODIMENT

Figure 1:
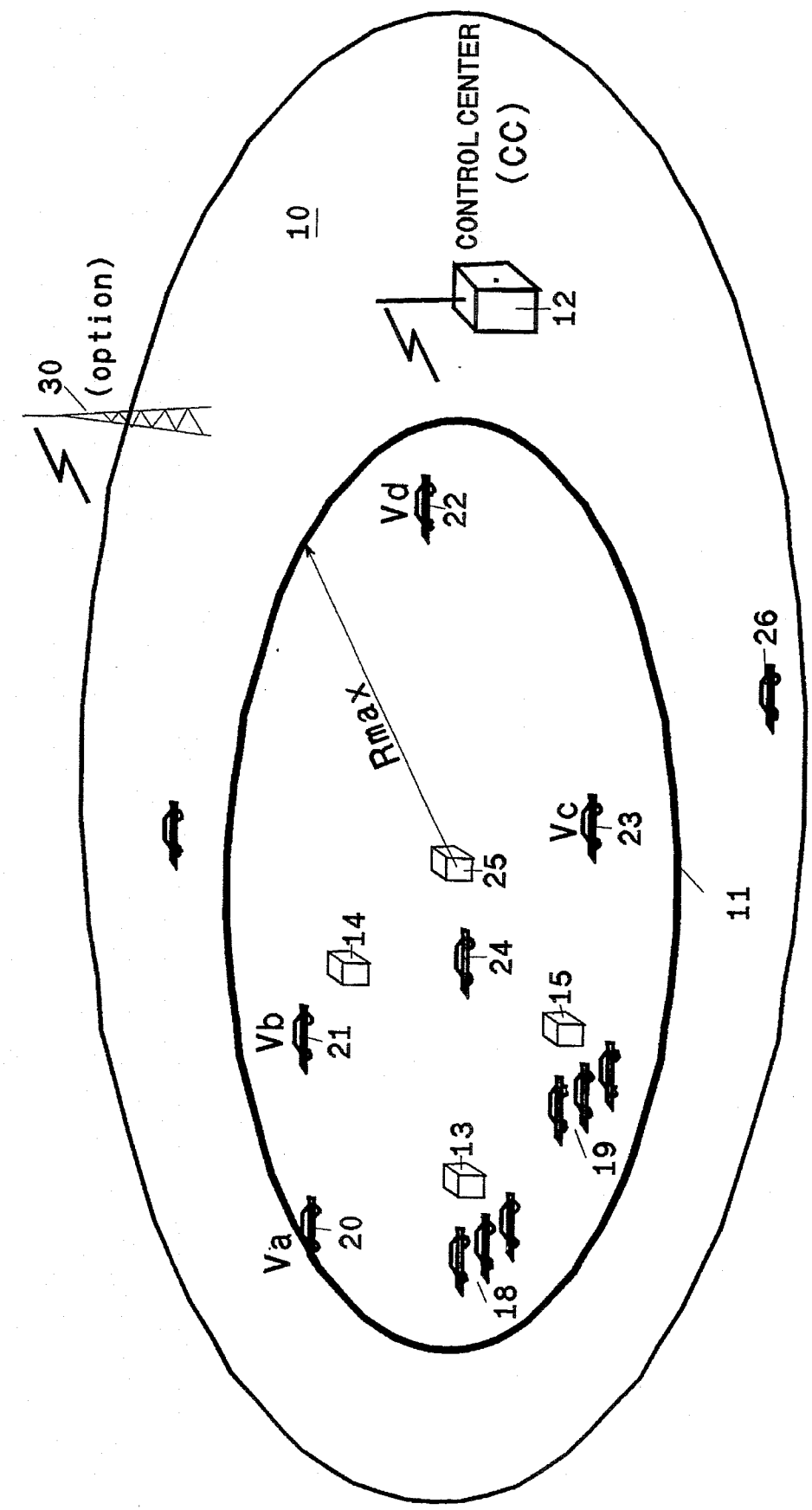
FIG. 1 shows schematically the principal components of a preferred system for carrying out a dispatching function in accordance with one preferred embodiment of the invention.

FIG. 1 shows a typical scenario of a dispatch situation in connection with which the invention may be employed. In this scenario a geographical area 10 is defined by a boundary 11 within which a system according to the invention is operational.

An identification system according to the invention includes a controller such as a control center (base station) 12 and, optionally, a plurality of taxi stands 13, 14 and 15 which constitute sub-control units each of which serves a respective region within area 10 and which may forward a customer request to control center 12.

Associated with each of stands 13, 14 and 15 are respective groups of participants (e.g. taxis) of which two groups 18 and 19 associated with stands 13 and 15, respectively, are shown in FIG. 1. The groups of participants 18 and 19 generally comprise some taxis which are stationary proximate their respective stands awaiting instructions therefrom and other taxis such as 20, 21, 22, 23 and 24 which are circulating within area 10 and are either available for performing a task on receiving instructions or, alternatively, are occupied and therefore unavailable.

A customer 25 located somewhere within area 10 relays a request for service to control center 12 telephonically via a Public Switched Telephone Network (PSTN). Control center 12, in turn, broadcast an invitation message to all of the participants in area 10 either directly or via a remote station 30 which is typically located so as to cover all of area 10. Control center 12 can also receive messages via station 30. Alternatively, control center 12 broadcasts and receives messages directly.

Remote station 30 may be located inside area 10, or alternatively if the area is built up with tall buildings, outside the boundary of the built-up area, if this siting reduces the blocking of signals between the taxis and the repeater station by tall building and the like or for other reasons.

Sometimes, customer 25 telephones a particular taxi stand since this is the nearest stand to the customer's location. In this case it is generally preferable that one of the taxis associated with the taxi stand be dispatched to the customer unless, of course, all of the taxis associated with the stand are currently occupied (or otherwise unsuitable), in which case one of the taxis associated with another of the stands will be allocated for the task.

In this case, the association of a taxi with a particular stand may constitute at least one of the criteria involved in choosing the taxi to be allocated to customer 25. Such a selection criterion is a static variable and, once fixed, never varies because a taxi is always associated with one stand. However, the actual priority assigned to each of the taxis is also a function of several independent dynamic factors which are subject to constant fluctuation. Of these, the taxi's distance from the customer is the most important example. However, other dynamic conditions pertaining to a taxi's instantaneous status also affect the respective priority of the taxi so that, for example, a taxi which is currently occupied or one which has insufficient occupancy for the number of passengers to be collected would not participate in the selection process and a taxi which is waiting at a stand would get priority. The idle time of the taxi can also be an important criteria.

It will be appreciated that in general there are many different contributory factors, or selection criteria, which influence the priority assigned to each individual taxi within area 10. Moreover, it is generally the case that each selection criterion has a different "weight" associated therewith so that the final magnitude of the priority associated with each respective taxi is built up from many different selection criteria each of which exert a different influence on the actual priority assigned.

For example, in the simplest case, it may be that only distance from the taxi to customer 25 is of concern. Such a simple case would not take into consideration the fact that other customers may already have requested service and may not yet have been processed. Thus, another customer near customer 25 but still somewhat further away from the nearest available taxi in area 10, may have a prior claim for service. However, in the simplest of systems where only distance from the taxi to the customer is important, such a prior claim would not be recognized.

In a preferred system where many factors are taken into account the priority assigned to each taxi may often be viewed as a multi-dimensional vector which is the vector sum of component priority vectors each relating to a different selection criterion.

A preferred method for allocating a task to one of the taxis in response to a request by customer 25 will now be explained with reference to FIGS. 2 to 7. For the sake of simplicity only, it will initially be assumed that the only selection criterion of interest is the distance of a taxi from customer 25.

Figure 2:
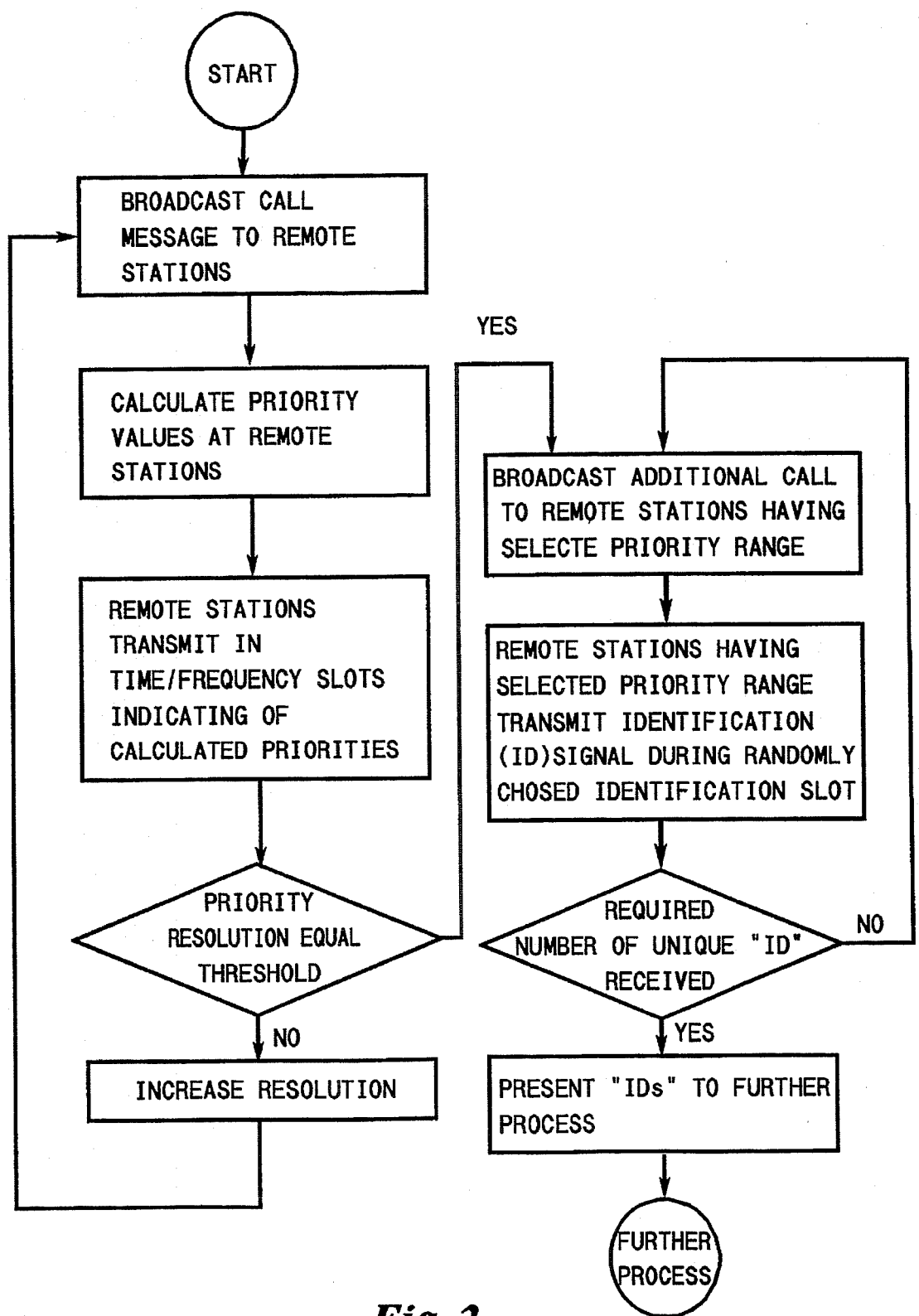
FIG. 2 is a flow diagram showing the principal steps associated with a preferred method of carrying out a dispatching function in accordance with the preferred embodiment of the invention.

FIG. 2, shows a flow diagram of the operation of a preferred system of the invention. The left portion of the flow diagram comprises operation of a first, targeting, phase and the right portion of the flow diagram comprises operation of a second, identification phase. The targeting phase starts with the broadcasting of a call message to all of the participating taxis informing them that a priority must be determined for responding to a pending request for service. The criteria for determining the priority may be sent together with the call or, alternatively, may be part of a preset protocol used for all such determinations. Alternatively, there may be several such protocols one of which the call identifies by a code. In the very simple case of a dispatching system wherein distance of a taxi from a specified location is the only selection criterion, there is no need to inform the taxi of the selection criterion each time an invitation message is transmitted.

Responsive to the call, each of the taxis uses the selection criteria to determine its own priority in accordance with the protocol. The protocol also includes a plurality of ranges of priority values and a communication protocol which subdivides a time period and/or a frequency range into a plurality of time or time/frequency slots each of which is associated with one of the ranges of priorities.

Each of the participants who is not immediately eliminated from further participation owing to gross unsuitability (e.g., they are already occupied or is already responding to a call) responds to the call message by transmitting an indication signal in the appropriate time or time/frequency slot in accordance with his respective priority. The indication time slots all start at a time relative to a time base common to all of the participants. It is important to note that all those responding participants having a priority within the same range respond at the same time and frequency. As a result, substantially simultaneous indication signals are received by the control center from those participants having the highest priority as determined at the current priority resolution according to the protocol. The indication signals, which are preferably pulsed CW (i.e., they are pulsed signals at a particular frequency having no information content other than that given by the time at which the transmission occurs and the frequency of the transmission), are sufficiently non-destructive with respect to other simultaneously transmitted indication signals and have at least sufficient pulse width so as to permit an indication that at least one of the taxis has responded in a given time slot. In certain cases it may be necessary to add some dithering or other variations to the signals so as to avoid destructive interference between the signals.

Since the indication signals may, and typically do, overlap, even a fairly narrow bandwidth broadcast channel may be employed, there being no requirement to discriminate between different indication signals in the same priority slot.

Furthermore, intermodulation effects between the indication signals in a given slot are not important, since only the presence of at least one indication is required, and the intermodulation does not affect this determination.

The control center monitors any response and determines which slots have a true indicator signal (as opposed to noise or other transients). Preferably, the time slots are arranged in descending order of priorities, such that the control center may ignore all slots after the first one (or some other small number of) "occupied" slot.

The control center targets all those responding taxis having the highest priority range in respect of which a valid indication signal has been received. Except as will be described below, taxis having a lower priority are excluded from further consideration.

If a predetermined criteria for stopping the targeting phase has not been reached, then an additional call is broadcast requesting all those taxis which have a priority within the highest priority range to respond. The response of the taxis is similar to that sent in the previous step except that the time or time/frequency slots now represent sub-ranges within the highest indicated priority range or ranges. In general the call will include this range and may include an indication of the protocol for dividing the slots among the priorities.

It should be understood that, for the more general case of multiple criteria, the priority vector may be a function of the iteration number or of the priority range. Thus for example, the first iteration may be used to eliminate taxis which are far away from the destination without giving much weight to the idle (waiting) time. The second iteration may give a greater weight to the idle time or to other factors. In general, taxis which have moved closer to the destination since the last call and have an increased priority may participate in the second iteration even if they did not have the highest priority in the previous iteration or were not detected as having this priority. Furthermore, a special slot may be provided for taxis whose priority is now higher than the highest range detected in the previous iteration. These taxis would take precedence over the other taxis by using the special slot.

This iterative reduction of the number of participants continues until a predetermined criteria is reached. This criteria may include consideration of the priority resolution achieved. The criteria may include a statistical estimate of the number of vehicles which have not been eliminated. For example, if in a given iteration in which a substantial number of sub-slots have been allocated, only one or a few sub-slots contain a response, it is then fairly certain that the number of taxis left in the system is small (or even one) and the iteration process (and the targeting phase) is ended.

Another iterative approach which may sometimes be used is to restrict the responders in the first phase to a single range or a limited number of ranges. Assuming that the range of interest is between 0–10 km from the customer. A first call would only ask for responses from those taxis which are closer than 5 km from the customer. This distance could be divided into ranges or a single range could be used. If there were no responses, then the call would request responses from those taxis in the range of 5–10 km. If there were a response, then further delineation of the range would successively narrow the range of distances. In this method of restriction all positive responses to the query are preferably broadcast in the same time/frequency slot.

Preferably, in the targeting phase no participants are actually identified, and therefore it is not yet possible for the control center to dispatch a particular taxi to the customer. Before this can be done, it is first necessary to complete a second, identification, phase wherein one of the taxis targeted at the end of the first phase is uniquely identified.

An additional call is broadcast or otherwise transmitted to the participants indicating that an identification phase is to begin. All of the targeted participants remaining at the end of the first phase are invited to broadcast or otherwise transmit their identification codes in one of a number of identification slots (which may be time or time/frequency slots, DS-CDMA or FDMA slots). These slots have a duration (or information bandwidth) commensurate with the information to be transmitted by the taxis. The number of identification time slots is determined in accordance with the protocol and is application-dependent, and may be based on the number of participants which are believed to be (or estimated to be) left.

For example, in a dispatching system, the priority scale may extend from a distance of 10 km from the customer location and the initial priority resolution (so far as the distance criterion is concerned) may be 1 km which is reduced during two successive iterations to 100 m and finally to 1 m. At such a fine priority resolution it is not to be expected that more than a small number of taxis will be targeted so a fast converging identification phase having only a few time slots ought to be sufficient for identifying one of the targeted participants. It is not suggested that a 1 m distance is significant in determining priorities for taxis, however use of such fine distinctions aids in reducing the number of taxis which participate in the identification phase. However, as will be explained below, the protocol has built therein sufficient discrimination to allow for possible errors in the number of identification time slots allocated and to compensate for such errors as required.

The identification slots are preferably not assigned in any way, and the taxis choose their slots in some random way. It can be expected that at for least some of the slots more than one taxi will broadcast its identification information. Such broadcasts probably can not be read by the control center which will choose the first taxi which it can identify. If multiple dispatches are required to the same destination, as for example where there are too many passengers for one taxi, the second phase may have to be repeated several times until the required number of taxis are dispatched. Furthermore, in extreme cases, it may be necessary to call for identification from taxis having a lower priority.

As in the targeting phase, a slot may be provided in the identification phase for taxis having a higher priority than the call. These taxis may have moved closer to the destination or their signal may not have been received by the receiver due to interference or blockage.

Having described the overall method for iteratively targeting, during a first phase, successively fewer participants and then, during a second phase, identifying a desired number of the targeted participants, there will now be described a specific application thereof to the scenario depicted in FIG. 1 and with reference to FIGS. 3 to 7 of the drawings.

Figure 3:
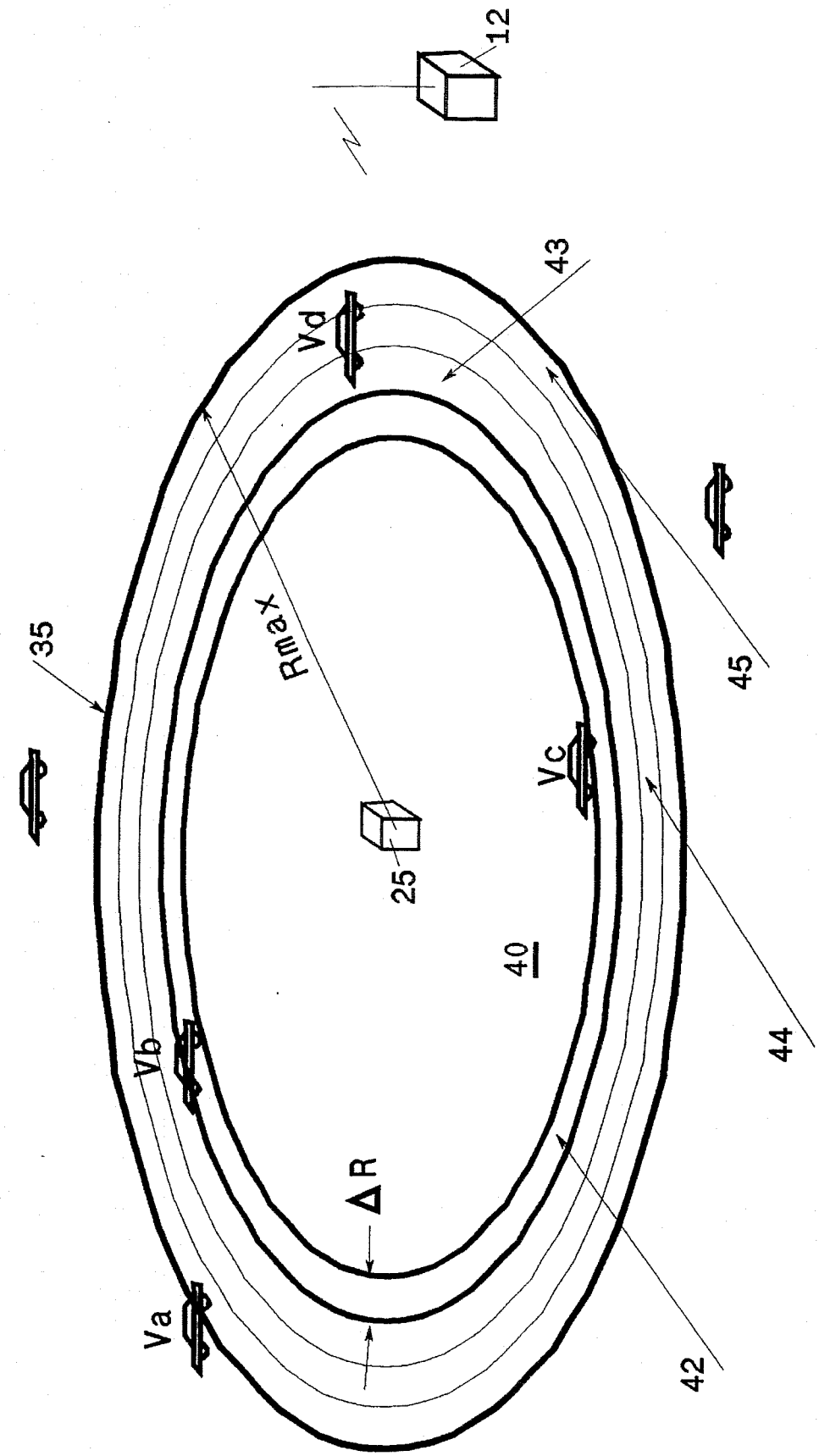
FIG. 3 shows schematically how vehicles are targeted during an initial phase of targeting based on distance from the customer location in accordance with a preferred embodiment of the invention for carrying out a dispatching function.

Referring then to FIG. 3, a customer 25 has requested a taxi. Shown within a circular target area 40 centered about customer 25 and having a boundary 35 at different distances from customer 25 are four taxi vehicles designated as $V_a$, $V_b$, $V_c$, and $V_d$. Vehicles outside boundary 35 are excluded from consideration.

Target area 40 is split into a plurality of concentric sectors of which only the outermost sectors 42, 43, 44 and 45 are shown each having a width ΔR and being radially disposed with respect to the customer. Adjacent sectors 42 and 43 or 43 and 44 or 44 and 45 are contiguous although for the sake of clarity and explanation they are shown in FIG. 3 as separated from each other.

It will be noted that vehicles $V_b$ and $V_c$ are within the first (innermost) sector 42, vehicle $V_d$ is within the middle sector 44 and vehicle $V_a$ is in the last (outermost) sector 45. Since it is desired to allocate the task of servicing the customer to the vehicle which is closest to him, it is clear that one of the two vehicles $V_b$ and $V_c$ in the innermost sector 42 must be identified as the most suitable for the task. It will also be apparent that the number of vehicles which exist in any particular sector is a function of the width of the sector. Thus, if the width of each sector is increased from $\Delta R$ to $3\Delta R$, it is apparent that vehicles $V_b$, $V_c$ and $V_d$ will now exist in the new, innermost sector comprising original sectors 42–44. In this manner, the width of each sector $\Delta R$ constitutes a priority resolution with which a priority is assigned to the participating vehicles. The coarser (i.e. lower) the resolution, the more vehicles will answer the selection criteria and be rated at a particular priority associated therewith while the finer (i.e. higher) the resolution, the smaller the number of vehicles which answer the selection criteria and are rated with the corresponding priority.

Thus, after a first step of targeting in which a small group of taxis is chosen, in a second step of targeting the highest priority taxi, a coarse resolution (finer however than that in the first step) is set as shown in FIG. 3 and an call message is transmitted by control center 12 to all of the participants. The call message also preferably defines a time interval $\Delta T$ which is divided into an equal number of time slots $\Delta t$ of equal width such that the total number of time slots is equal to the total number of priorities: i.e. the number of sectors. In a further preferred embodiment of the invention, frequency diversity can be used to define multiple slots at the same time, each of the slots being at a different frequency distinguishable by the control center.

Upon receiving the call message, each of the participating taxis determines its priority in accordance with the selection criteria, which, in the simplest case, is assumed to be solely the distance of the participant from the customer and within the maximum radius $R_{max}$. Thus, vehicles $V_b$ and $V_c$ are both assigned the highest priority, while vehicles $V_d$ and $V_a$ (in that order) are assigned successively lower priorities. It should be noted that typically there may be hundreds of vehicles in the target area 40; only a few are shown in the figure for the sake of clarity. Further, each vehicle may have a handset (see FIG. 9) having a disabling switch by means of which the driver can prevent the transmission of a response message upon receiving an call message from control center 12. By such means he can go off duty, etc.

The active participants $V_a$ to $V_d$ now transmit an indication signal within the time slot $\Delta t$ corresponding to their priority. Thus, vehicles $V_b$ and $V_c$ transmit an indication signal first; vehicle $V_d$ transmits his indication signal second; and vehicle $V_a$ transmits his indication signal third. In an actual situation, of course, there may exist many time slots corresponding to a large number of coarse resolution priorities and perhaps hundreds of vehicles will transmit an indication signal in the same time slot. This, in itself, is not important because all that matters during this first phase of the process is to determine the first time slot in which a vehicle transmits an indication signal.

This having been done, it is immediately clear which is the nearest sector to the customer in which at least one vehicle is located and therefore all of the vehicles in all of the other sectors may now be eliminated. In a practical implementation of such a system, the broadcast and receive time for transmitting the call message from the control center to the participants and receiving the first indication signal therefrom takes a short time. Thus, in a relatively short time interval thousands of participants in the field can be reduced to a small number of potentially suitable participants for the task, without the use of excessive frequency spectrum.

Furthermore, if a full duplex communication system is used, the control center need not wait for the entire time $\Delta T$, and can go on to the next iteration or the next phase immediately when a first indication signal is received.

As explained above, this process is repeated iteratively as often as required, each iteration having successively finer priority resolutions (i.e. sectors of successively decreasing width $\Delta R$), until a predetermined resolution is reached. At this point, the width of the remaining sector is sufficiently small that only a small number of participants are likely to be found therein. It is, of course, not known how many participants there are in this remaining sector since regardless of whether only one participant or many send an indication signal in a particular time/frequency slot, the control center does not receive a message which is capable of uniquely identifying any one of those participants.

It should be noted that the receive time taken for the control center to process a response from the highest priority participants is a function of the number of time slots $\Delta t$. Thus, as the resolution is increased, there will be more time slots and, since each requires a minimum transmit time, it might take longer to identify the highest priority time slot. There is therefore a tradeoff between, on the one hand, increasing the resolution so as to identify the most suitable participant in fewer iterations and, on the other hand, increasing the cycle time of a given iteration by doing so. The choice of initial resolution and rate of increasing the resolution may be made based on the number of participating vehicles and or a priori expectations of the responses. Thus, the range of values of a priority which are assigned a given sector may be based on the number of expected units having that priority. If distance is the sole criteria, the range of distance values may be proportional to the distance so that the area of the sectors assigned to each priority may be the same.

Figure 4:
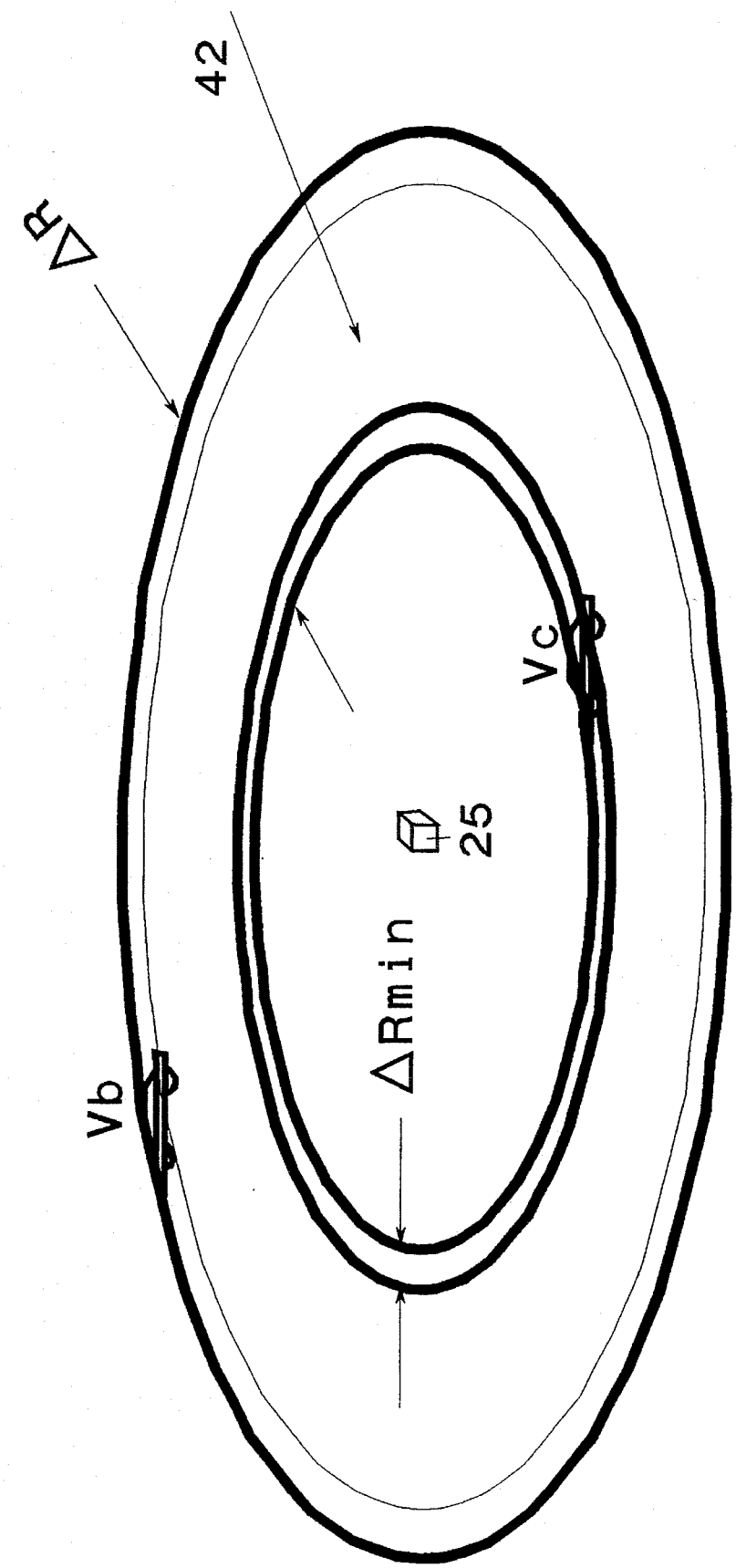
FIG. 4 shows schematically how vehicles are targeted during a second iteration of targeting based on distance.

FIG. 4 shows a subsequent iteration of the targeting phase wherein the priority resolution is increased and a further call signal is transmitted to the participants. The currently targeted participants $V_b$ or $V_c$ in what is currently the highest priority sector 42 are assigned new slots according to the finer priority resolution and again transmit indication signals during time slots corresponding to their priorities. As a result, it transpires that $V_c$ has a higher priority than $V_b$ and its indication signal is therefore transmitted first (or in a slot corresponding to a high priority, even if such slot is not first). However, from the perspective of the control center, there is no way of knowing how many participants exist in what is now the highest priority sector. All that can be known is that at least one participant has the priority.

Thus, while there may still be hundreds of participants in the targeted sector, it is expected that with the increased priority resolution only a small number of participants will now be targeted. One of these is now to be identified to respond to the request for service. During this second phase of identification, the control center assigns a new time interval $\Delta T$-ID and divides this time interval into a number of equal width time slots $\Delta t$ (or time/frequency slots) related to the expected number of participants in the highest priority sector 42. The expected number of participants in sector 42 is determined statistically as a function of the resolution of the sector ΔR and according to the application. The only remaining targeted participant $V_c$ in the highest priority sector 42 now selects randomly one of the time slots and transmits, within the randomly selected time slot, an identification message whereby the sending participant can be uniquely identified.

In the more general case, where there are still a number of targeted participants, the control center receives a plurality of identification messages some of which may, of course, have been transmitted during the same randomly selected time (or time/frequency) slot. It is understood that where two signals are transmitted at the same time and frequency, no information on the identity of the transmitting participant in the absence of a capture effect. However, it is expected that at least one of the identification messages can be uniquely identified and, in this case, the task is allocated to a participant which can be identified. Where possible, of course, in the interest of speed, the task is allocated to the first uniquely identifiable participant.

If it is not possible to identify one of the participants uniquely, the communication protocol allows for appropriate action according to each particular situation. Thus, it may be that during the final iteration in phase one, no participants were targeted. This itself could be due to several different reasons: for example, the call message may never have reached the participants or, more likely, the response of the highest priority participants may not have been received, possibly having been obstructed by an obstacle in its path.

Alternatively, possibly too many participants were targeted in the final iteration of phase one and an insufficient number of identification time slots were allocated during phase two. In this case, identification messages may collide during all of the identification time slots, rendering it impossible to identify any one participant. In the more general case where more than one participant is to be identified, it may also occur that too few identification messages arrive in phase two owing to an insufficient number of participants having been targeted in phase one.

The various strategies for dealing with each of these possibilities from the point of view of the control center will now be described with reference to FIGS. 5 and 6 which show state diagrams relating to the targeting and identification phases, respectively. In both of these diagrams the following terminology is employed:

| | |
|---|---|
| PHASE-1.x | $x^{th}$ iteration of phase 1; |
| PHASE-2.x | $x^{th}$ iteration of phase 2; |
| IB | Control center's Broadcast Message; |
| RD | Responders' signal Detection and signal processing; |
| IBPH1.x | Control Center's $x^{th}$ Broadcast messages in Phase 1; |
| IBPH2.x | control centerts $x^{th}$ Broadcast messages in Phase 2; |
| ΔTRTPH1.x | $x^{th}$ time interval for Responder's Transmission activity in Phase 1; |
| ΔTRTPH2.x | $x^{th}$ time interval for Responder's Transmission activity in Phase 2; |
| x | Number of iterations in Phase 1 or 2 (application-dependent); |
| NIP | Total number of iterations performed in current Phase; |
| Limit1, Limit2 | Application-dependent maximum number of iterations for Phases 1 and 2, respectively. |
| n | predetermined number of successful iterations |
| PS | Priority slot |

Figure 5A:
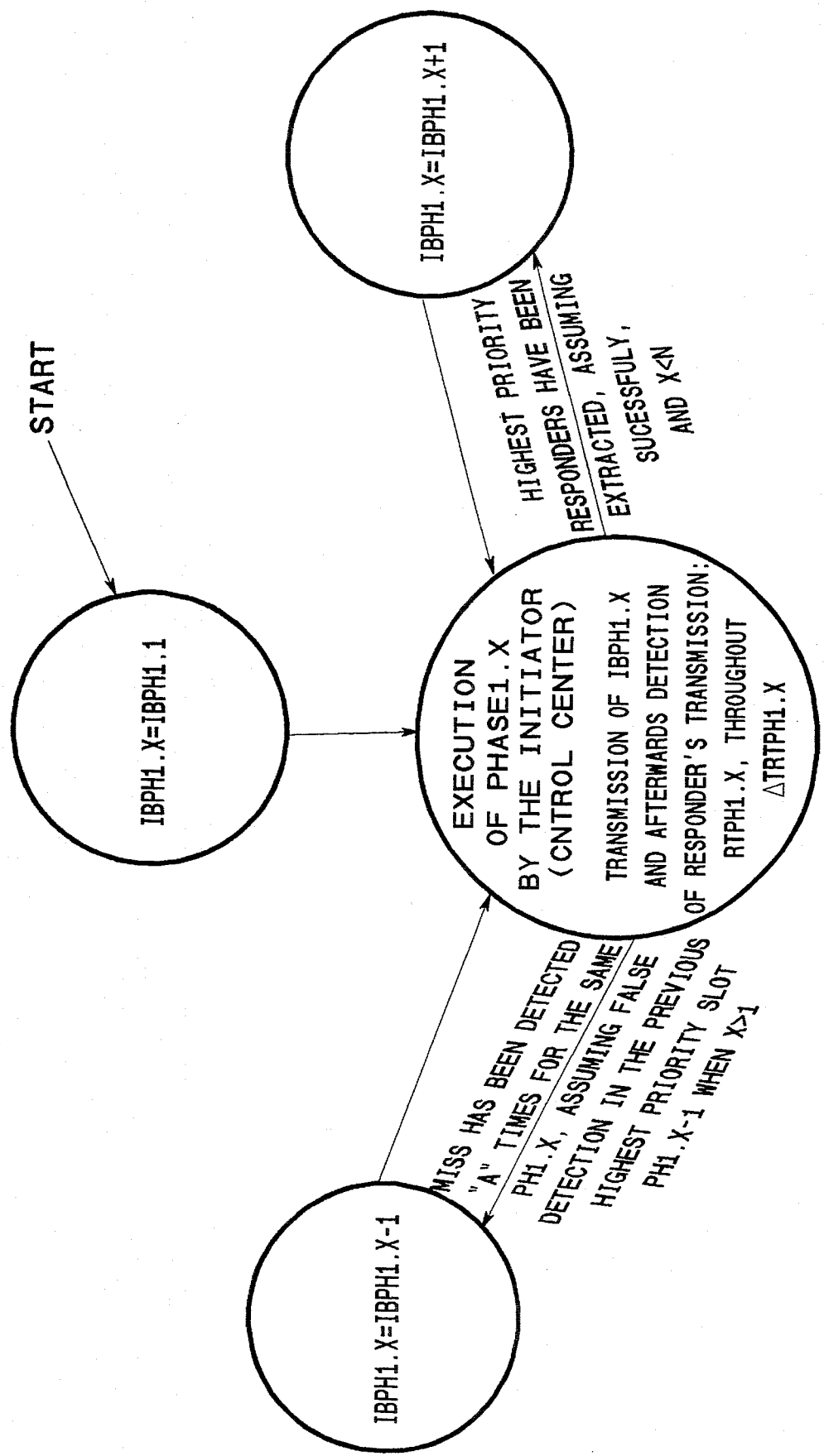
FIGS. 5A and 5B are two portions of a state diagram showing various options associated with a first targeting phase according to a preferred embodiment of the invention for carrying out a dispatching function.
Figure 5B:
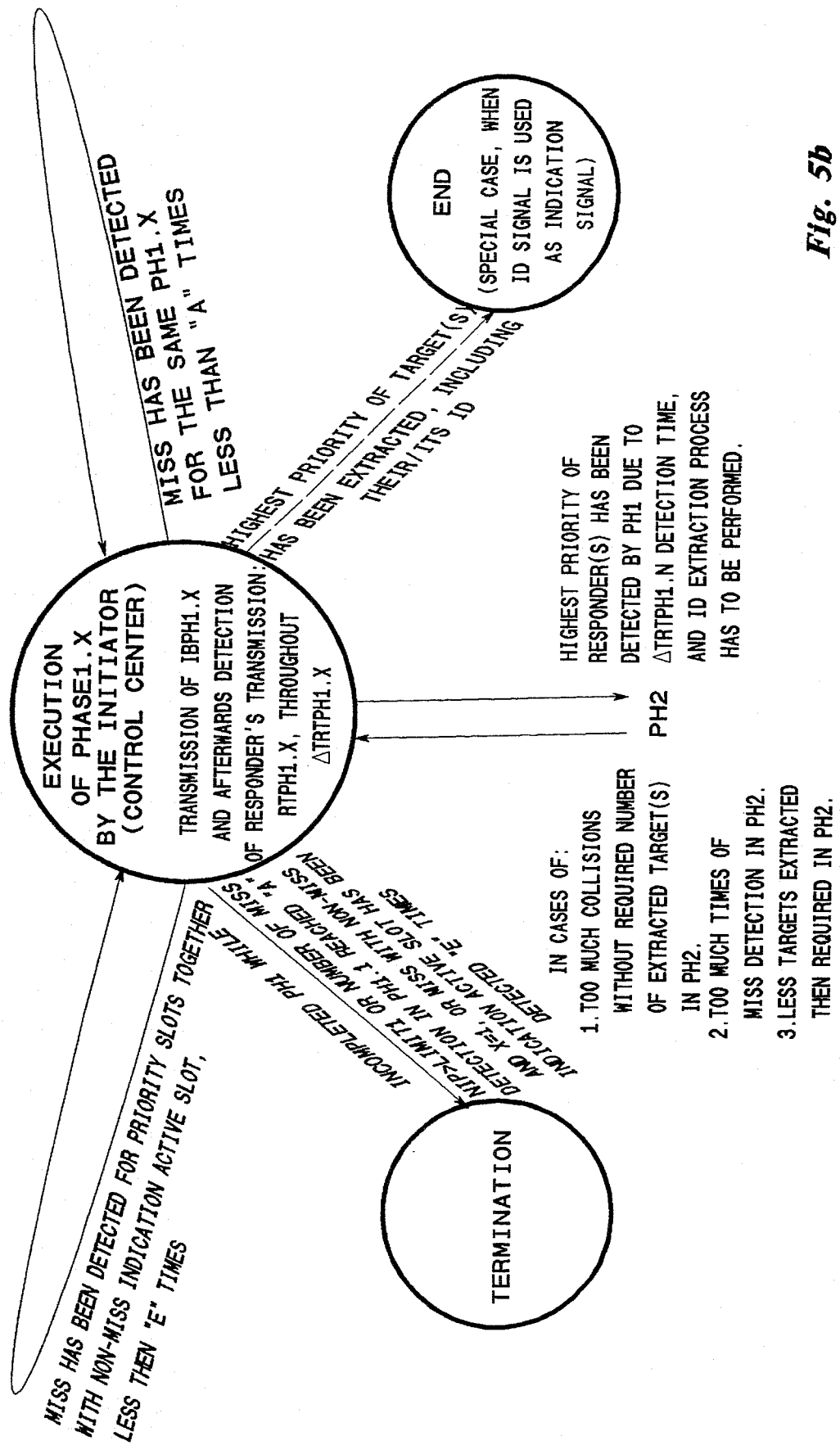

Thus, referring to FIGS. 5A and 5B, if during a successive iteration, no indication signal is received (i.e. a MISS is detected), the initiator requests at least once that all of the participants who have not yet been identified transmit a respective indication signal and this is repeated until an indication signal is received or for a maximum number of iterations determined in accordance with the protocol. Thereafter, whilst the resolution is higher than a minimum resolution determined in accordance with the protocol (and the iteration process has not been terminated for some other reason), further priorities having a coarser resolution are assigned to all of the participants who have not as yet been identified, or until the resolution reaches the minimum resolution.

Another way of checking if a MISS is true is to provide an additional slot during which all of those stations which should have broadcast during the designated priority slots will broadcast again. If no signal is received during this slot, the MISS is verified.

Figure 6A:
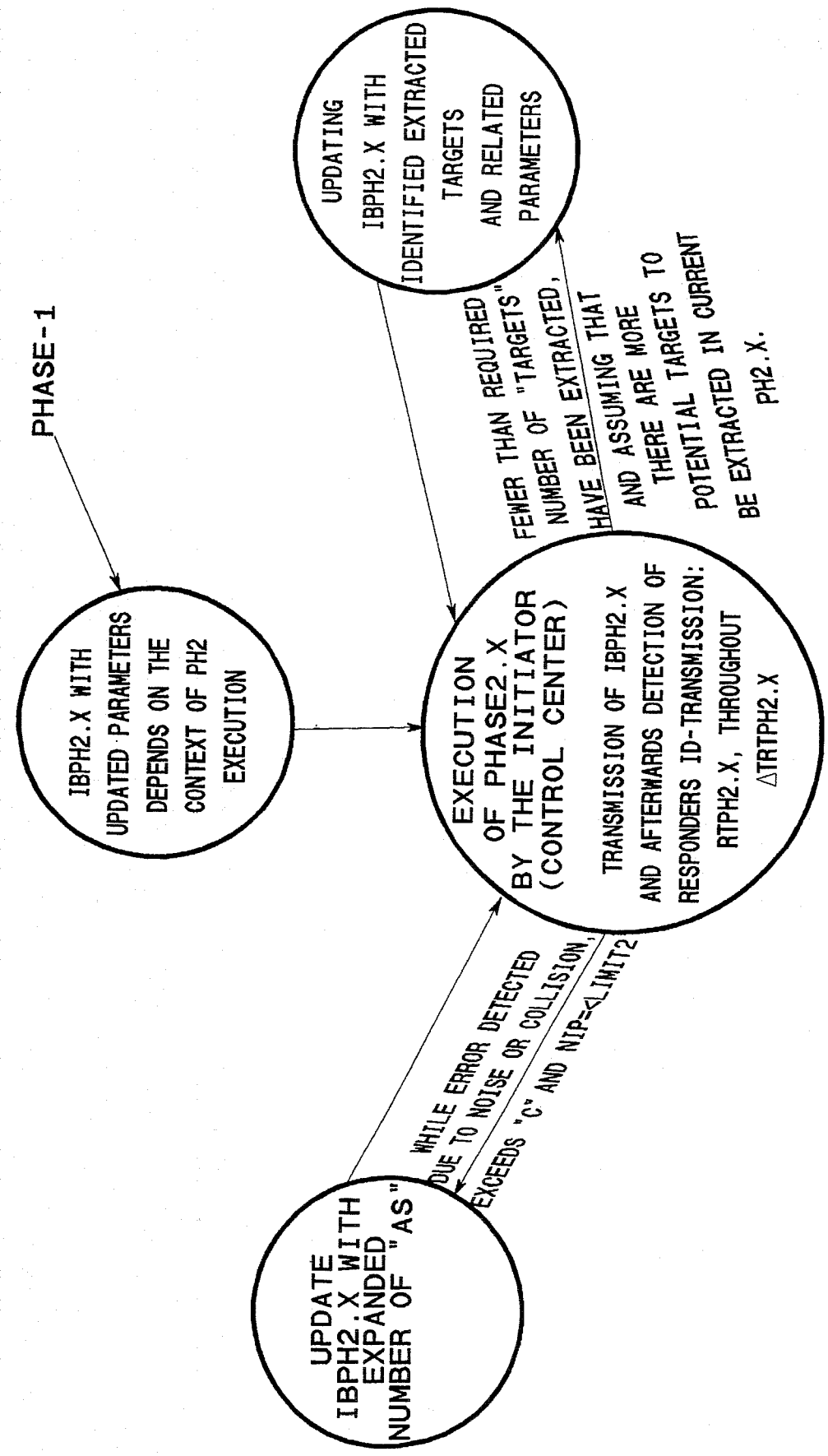
FIGS. 6A and 6B are two portions of a state diagram showing various options associated with a second identification phase according to a preferred embodiment of the invention for carrying out a dispatching function.
Figure 6B:
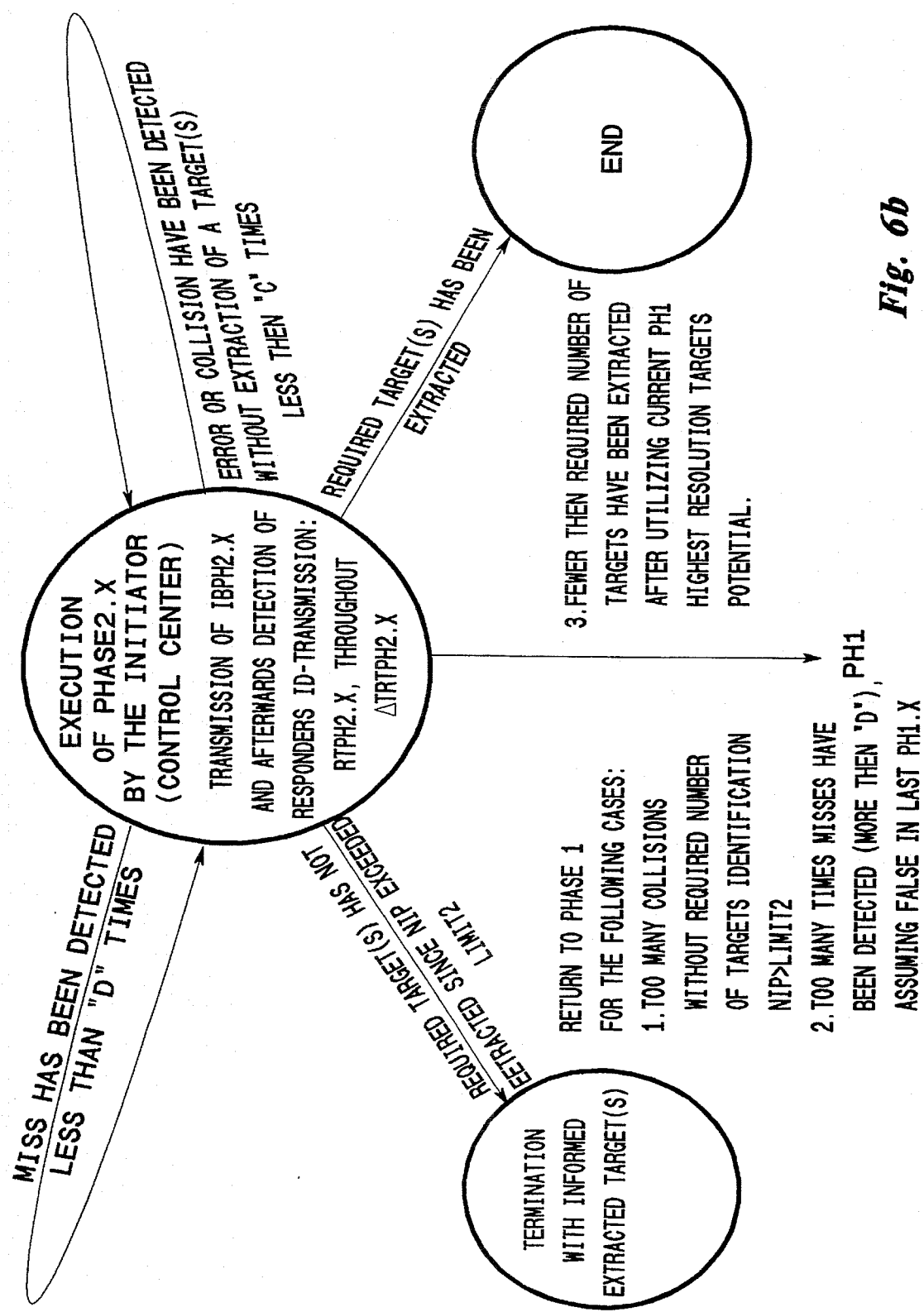

Referring to FIGS. 6A and 6B, if during any iteration no identification message is received by the control center and during preceding iterations fewer than the desired number of identification messages were received so as to permit identification of the respective participants or if invalid data were received, there is further included the step of the control center requesting at least once that any currently targeted participants who have not yet been identified re-transmit their identification message.

If fewer than the desired number of valid identification messages are received so as to permit identification of the respective participants owing to the occurrence of more than one identification message arriving in the same identification slot or to any other reason such as receipt of erroneous data, thereby rendering it impossible to determine the respective identifications, the following courses of action may be taken.

One possibility is for the control center to allocate to all of the targeted participants still remaining and who have not yet been identified a greater number of discrete identification time slots than the number previously allocated, and to invite the targeted participants who have not yet been identified to transmit a respective identification message during one of the new identification time slots. In other words, the number of targeted participants is maintained but more identification time slots are allocated so as to increase the probability that the desired number of valid identification messages will be received by reducing the probability of collisions. Alternatively, the taxis can be required to choose a random number which can then be compared to some reference number to eliminate some of the taxis or which can be used in changing the priorities of the taxis to eliminate some of them. Alternatively, an additional criteria may be added to reduce the number of participants.

Alternatively, if the protocol allows a maximum priority resolution, then so long as the current priority resolution is lower than the maximum priority resolution, phase one can be repeated as required for a maximum number of iterations determined in accordance with the protocol at successively finer priority resolutions, until the maximum resolution is reached in respect of all of the participants who have not as yet been identified. This causes fewer participants to be targeted and again reduces the probability of collisions in phase two when any newly targeted participants are identified.

If, on the other hand, during a successive iteration, fewer than the desired number of valid identification messages are received so as to permit identification of the respective participants owing to an insufficient number of participants having been targeted during preceding iterations, then the opposite must be done. Thus, so long as the resolution is higher than a minimum resolution determined in accordance with the protocol, phase one is repeated as required for a maximum number of iterations determined in accordance with the protocol at successively coarser priority resolutions until an indication signal is detected or the minimum resolution is reached. This process is performed in respect of all of the participants who have not as yet been identified and, by targeting participants in phase one who were not previously targeted, increases the probability that the desired number of newly targeted participants will subsequently be identified in phase two.

If, during phase one, no indication signal is received in response to an call message, the control center requests at least once that the participants re-transmit an indication signal. On receipt of the call message, the participants assign themselves priorities and transmit respective indication signals during a corresponding indication time slot. This covers the possibility that the call message never reached the targeted participants or, alternatively, that their responses never reached the control center.

In all of the above cases, data is stored in respect of any participants who have already been identified and subsequent iterations are performed only to identify additional participants.

The protocol includes at least one termination condition whereby further iterations are not performed even if no indication signal has been received and/or if fewer than the desired number of participants have been identified. This is necessary to avoid an infinite loop being executed in the event that, in a particular application, there are not enough participants who can be identified.

Figure 7A:
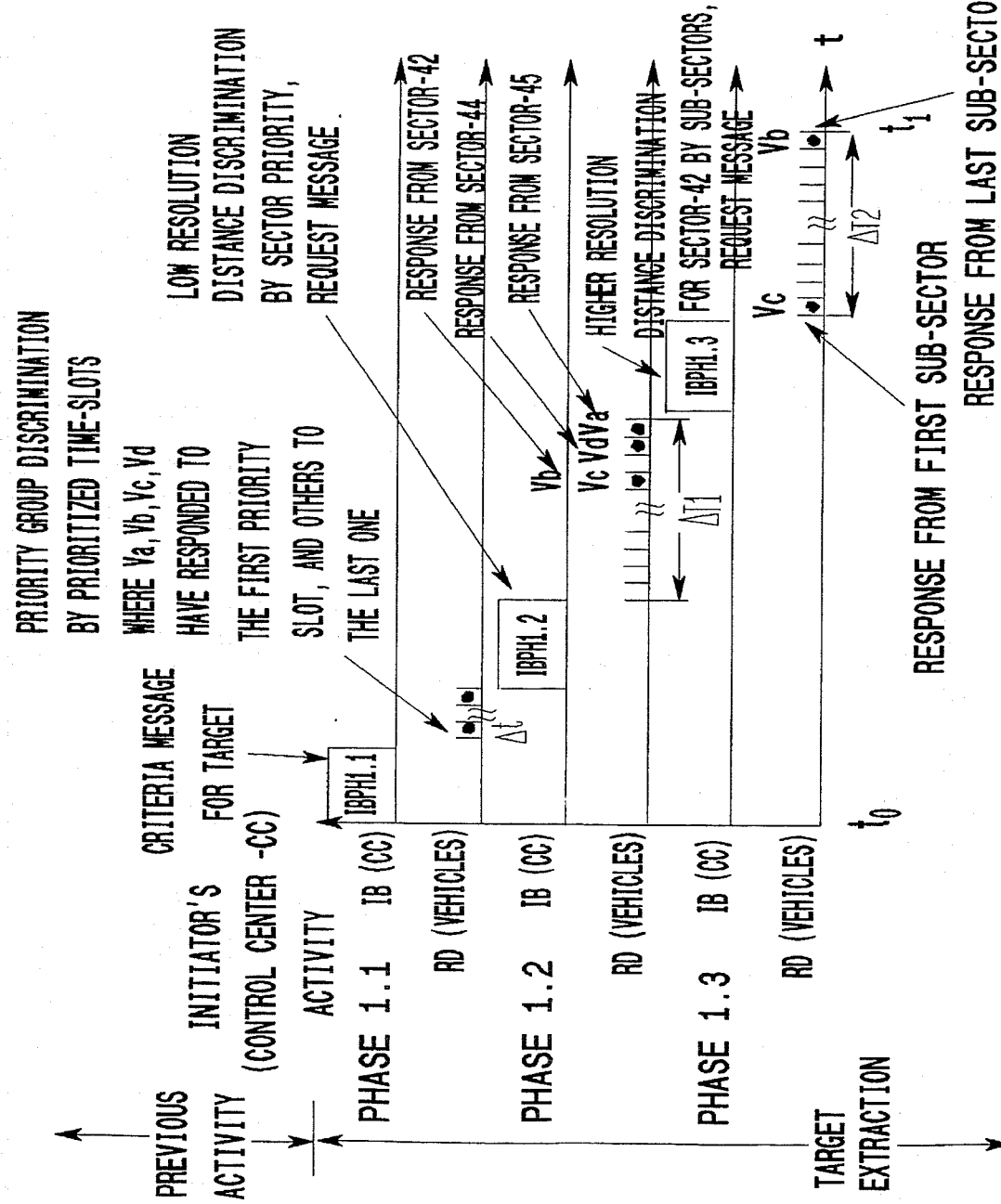
FIGS. 7A, and 7B show timing diagrams relating to the targeting and identification phases respectively of a priority discrimination according to a preferred embodiment of the invention for carrying out a dispatching function.
Figure 7B:
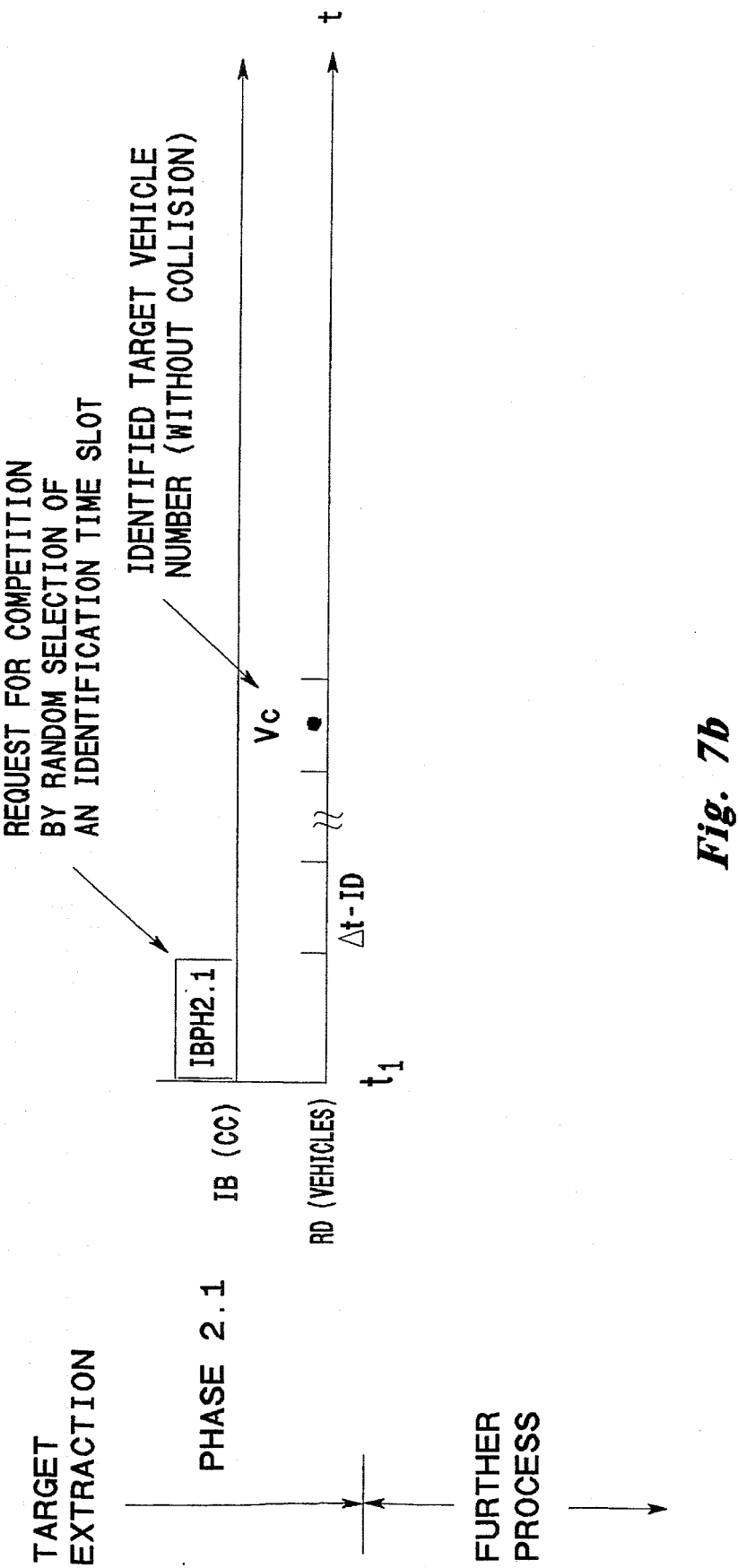

FIGS. 7A and 7B show a timing diagram relating to the flow of information between the control center and the participants $V_a$, $V_b$, $V_c$ and $V_d$ during the example of FIGS. 3 and 4.

It will be noted that in the initial phase of targeting, each participant selects a time slot according to his respective priority, such that participants with the highest priority transmit first. Consequently, as soon as the control center receives a response from the participants, the highest priority may be determined immediately in accordance with which time slot data was first received. Further iterations may now be effected, as required, there being no need even to await the responses of lower priority participants. This results in very rapid convergence of the targeting phase to the priority range containing the most suitable participant. This requires a full duplex system. FIGS. 7A and 7B show the timing diagram for a half duplex system.

In another embodiment of the invention priorities may be assigned according to a measured elapsed time since participants have performed some activity. For example, priorities are assigned to taxis according to the time they have been idle.

In a first iteration of phase one, the mutually common priority scale relates to an elapsed time of say 3 hours and the priority resolution is say one-half hour. Thus, each interval in the priority scale corresponds to an elapsed time of one-half hour.

In a second iteration of phase one, the mutually common priority scale relates to an elapsed time of one-half hour and the priority resolution is 2.5 min. Thus, each interval in the priority scale corresponds to an elapsed time of 2.5 min. If the during the first iteration a signal was received in the time slot of two to two and one-half hours, then the time slots in the second phase may have a resolution of 2.5 min. and span the range between these limits.

If this is considered to be sufficiently fine so that not too many participants will have the same priority, the process is terminated after only two iterations. It is now appropriate to implement phase two wherein one of the targeted participants is identified.

It will be understood that since, during the identification phase, a participant may be, in effect, selected randomly, it cannot be assured that the identified participant is actually the one who has waited the longest. However, it can be said with certainty that the identified participant has the highest priority to within the priority resolution (in this case 2.5 min.).

If, notwithstanding the above expectation, it becomes impossible to identify a single participant in phase two owing to too many participants having been targeted during phase one, then, as explained above, several options are available. More identification time slots can be allocated in phase two or, alternatively, a further iteration in phase one can be performed at an even finer priority resolution, for example 6 sec., before repeating phase two in respect of a smaller number of targeted participants or one of the other options described above may be employed.

In all of the embodiments described above, at least two phases are required to identify a targeted participant. Thus, during a first phase, participants are only targeted and are identified during a subsequent second phase. However, according to another preferred embodiment of the invention, provision may be made for identifying a participant during the first phase by transmitting an identification message as the indication signal. The identification message can be decoded in the particular circumstance that only one participant has the highest priority, so that only one indication signal is transmitted in the highest priority time slot, and there is a sufficiently long time interval between receipt of successive indication signals by the control center to allow decoding of the identification signal before a lower priority indication signal arrives in a subsequent indication time slot. Alternatively, the identification time slots are made long enough so that different slots have minimal or no overlap. In this particular case, the second phase of identifying the targeted participants is eliminated. It should be noted that, generally, this embodiment of the invention is less efficient than the embodiment which uses non-information bearing signals in a first, targeting, phase to reduce the number of vehicles in a second, identification, phase.

Yet a further consideration relates to the possibility that the highest priority participant may not be targeted in phase one owing to a malfunction. Thus, for example, his indication signal may not be received having been obstructed by an obstacle in his path or where his signal is subject to fade. This may not matter if other participants having the same priority have nevertheless been able to transmit indication signals, since if the indication time slot having the highest priority is determined and all the participants associated therewith are targeted, even a participant whose indication signal was lost will still be targeted. However, if a sole participant's indication signal is lost this could prevent correct determination of the highest priority participant.

The protocol can take this possibility into account by reserving, preferably, the first indication time slot in the next iteration for exclusive transmission therein by a non-targeted participant having a higher priority than that of the targeted participants. The control center then transmits a call message inviting the targeted participants to transmit a respective indication signal during any one of the indication slots except the reserved indication slot.

So far as newly targeted participants are concerned, the process is essentially unchanged; each of the newly targeted participants transmits an indication signal one of the unreserved indication slots according to his respective priority. However, any previously non-targeted participant having a higher priority than that of the newly targeted participants transmits a respective indication signal during the reserved slot.

Within a single iteration of phase one, the assignment of priorities to each participant may be performed in respect of a different sub-set of selection criteria for at least some of the participants. In effect, this permits different search strategies to be executed each in respect of a respective indication slot. For example, the first indication slot having the highest priority may relate to all participants who are located within a radius of 10 m from the customer without any further restriction; whilst the second indication slot may relate to all participants who are located within a radius of 25 m and who have been awaiting instructions for more than 20 minutes. By this means Boolean OR search or other search strategies can be performed in a single iteration.

Furthermore, during each iteration the participants may optionally assign themselves a priority having a magnitude outside the priority scale so as not to be targeted by the initiator. This can be done if, for example, a participant is otherwise occupied or for any other reason does not wish to receive instructions.

During a particular iteration the priorities assigned to each participant are generally absolute with respect to a mutually common scale which itself is external to the participants and independent thereof. However, between successive iterations the priority scale may well relate to different combinations of selection criteria. By this means finely tuned search strategies can be performed whereby all participants answering to a first combination of selection criteria are targeted during a first iteration, whilst all of the targeted participants answering to a different combination of selection criteria are targeted during a successive iteration.

Alternatively, the combination of criteria which make up the priority may be information dependent and, for example, different groups of slots may relate to different combinations of criteria.

Once a sufficiently small number of participants are targeted such that, in accordance with the protocol, identification of a desired number of participants is likely to yield a successful outcome, the second phase described above is commenced. The number of identification slots to be allocated to the targeted participants is calculated by first estimating the number of targeted participants remaining at the end of phase one. The number of identification slots is then calculated according to the estimated number of targeted participants who must transmit respective identification messages, so as to reduce the total time required to identify the required number of participants.

In this connection, it will be realized that there exists a tradeoff between allocating too many and too few identification time slots. Specifically, allocating too many identification time slots reduces the probability of a targeted participant selecting an early identification slot, thereby increasing the time required to identify the highest priority participants. On the other hand, allocating too few identification time slots increases the probability that more than one participant will select the same identification time slot. In this case, the resulting collision of more than one identification message makes it impossible to identify the respective participants, requiring further iterations and again increasing the identification time. In practice the number of identification time slots may be minimized by increasing the maximum priority resolution in phase one in order to target no more than the expected number of participants who are to be identified in phase two, or by using a random process to eliminate some of the participants, such as that described above.

In the specific embodiments described above the process of assigning priorities to each of the participants is performed within the participating vehicles themselves since only they know their locations relative to the customer. Moreover, the onus of tracking the participants' movements in terms of their location, availability, occupancy, loading and all the other selection criteria which may be of significance is now passed to the participating vehicles themselves as opposed to most hitherto proposed systems wherein a central dispatcher had to keep track of all these parameters.

As a result of this, the communication channel between the control center and the participants may be of relatively narrow spectrum width compared with that of hitherto proposed systems. Additionally, the task of targeting potentially suitable participants is distributed amongst the participants themselves rather than being determined solely by the control center. Such distribution results in a reduction of computing power being required by the control center.

While the selection criteria must obviously be known to the participating vehicles, the manner in which this is made known can be varied according to circumstances. Thus, for example, the selection criteria may be fixed and known in advance to the participants (in which case the selection criteria are not subject to change). Alternatively, the selection criteria may be determined on-line by the control center and then transmitted to all of the participants together with the call message.

Thus, in the particular example described above, during the first phase of targeting it may be predetermined that each sector has a width of 10 km and that in subsequent phases, the width of each remaining sector is reduced, for example, by a factor of 10 until the sector has a width of only 10 m, whereupon all those vehicles within the 10 m width sector send an identification message; or, alternatively, the width of each sector in each respective phase of allocation may be transmitted to the participants by the control center. In order to reduce the number of participants in the identification phase, the resolution in the targeting phase may be increased artificially, i.e., past the point at which it is meaningful.

It should also be noted that once a particular participant has been uniquely identified to perform a task, he is notified of this in the normal way by the control center, in any one of a number of ways which are well known in the art as for example, by voice over a communication channel or by text or other data transmission.

Furthermore, although in the preferred embodiment described above, one participant is uniquely identified as the most suitable, in fact it may sometimes be appropriate to omit the second phase of identification altogether. In such cases, the participants having the highest priority are not uniquely identified as individuals but all are identified as a group. One such situation relates to the improvement of service in particular areas. In this situation the number of taxis in a given area (a given distance from a fixed point) is monitored and additional cars are sent in to the area if there are not enough cars in the area. The number of cars may be estimated statistically, for example, from the number of slots having responses in very fine priority slot situation.

Another application of the system of priority assignment according to the invention is in the assignment of available lines for car-phones or transceivers. Presently, available lines are allocated on a when available basis. Thus, one unlucky user may wait a long time while a lucky user may get an immediate line. In a preferred embodiment of the invention, when a user wants a line, he indicates this either by pressing a call button or by lifting his receiver. A computer chip associated with the car-phone notes the time at which a line was requested.

Lines are allocated on a waiting time basis. In operation, a control center broadcasts a call for priorities in accordance with a targeting phase of the present invention. The priority is assigned according to waiting time, and the individual phones broadcast signals during time slots assigned according to their waiting time or by some other special priority. During a second identification phase one of the phones is identified, in the same manner as described above, and is given the available line.

Figure 8:
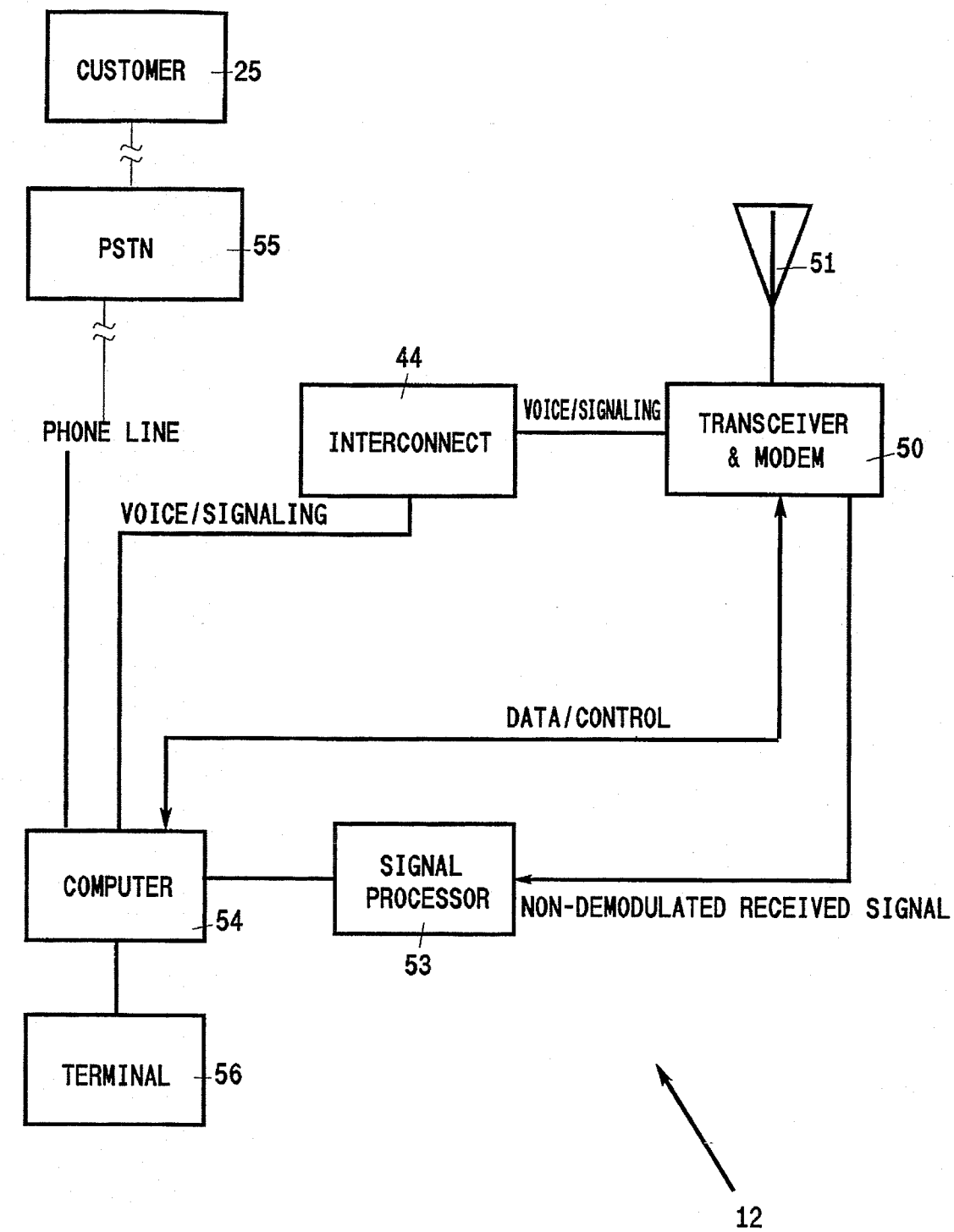
FIG. 8 is a block diagram showing the principal components in a control center according to a preferred embodiment of the invention for carrying out a dispatching function.
Figure 15:
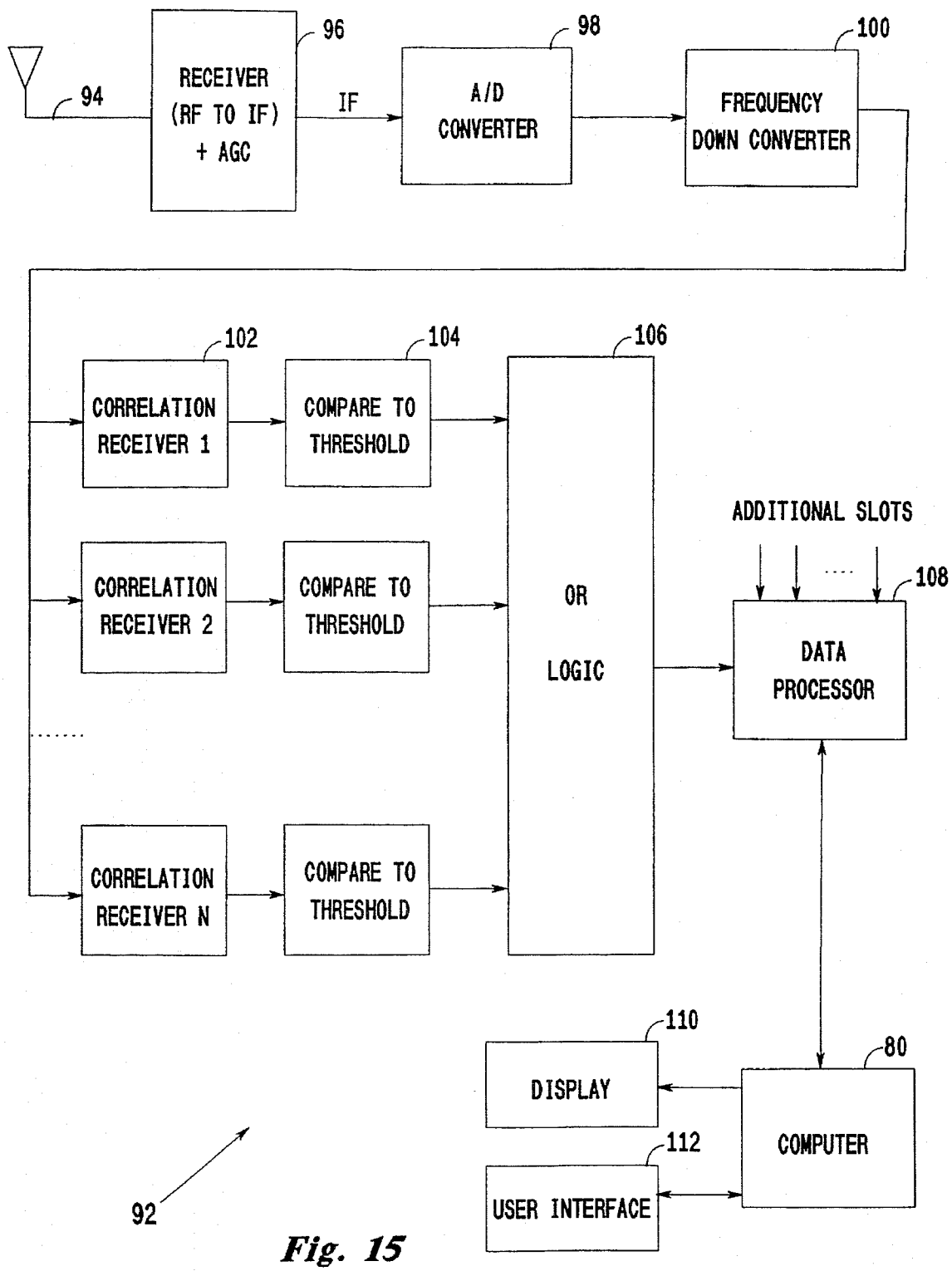
FIG. 15 is a block diagram of a receiver for useful for both IVHS and dispatching systems in accordance with a preferred embodiment of the invention.

Referring now to FIG. 8 there is shown schematically the principal features associated with control center shown in FIG. 1. Thus, there is provided a transceiver and modem 50 coupled to an antenna 51 for effecting bi-directional communication with the participants (taxis) and being connected to a message processor 53 which is coupled to a computer 54. Message processor 53 receives non-demodulated signals from the transceiver and determines which slots contain signals for the targeting phase and identifies the participant(s) in the identification phase. A preferred embodiment of such a receiver is shown in FIG. 15.

A service request is effected by customer 25 by telephoning his nearest taxi rank and then dialing his telephone number, the request being routed to the computer 54 via a Public Switched Telephone Network (PSTN). The computer 54 converts the customer's telephone number to a corresponding location based on a data base stored in the computer. Alternatively, such communication can be effected via an operator. A terminal 56 is coupled to the computer 54 for allowing an operator to enter commands and display data. In addition the system also allows for voice signaling to a dispatcher at the control station or for voice communication between the taxi driver to the customer.

Figure 9:
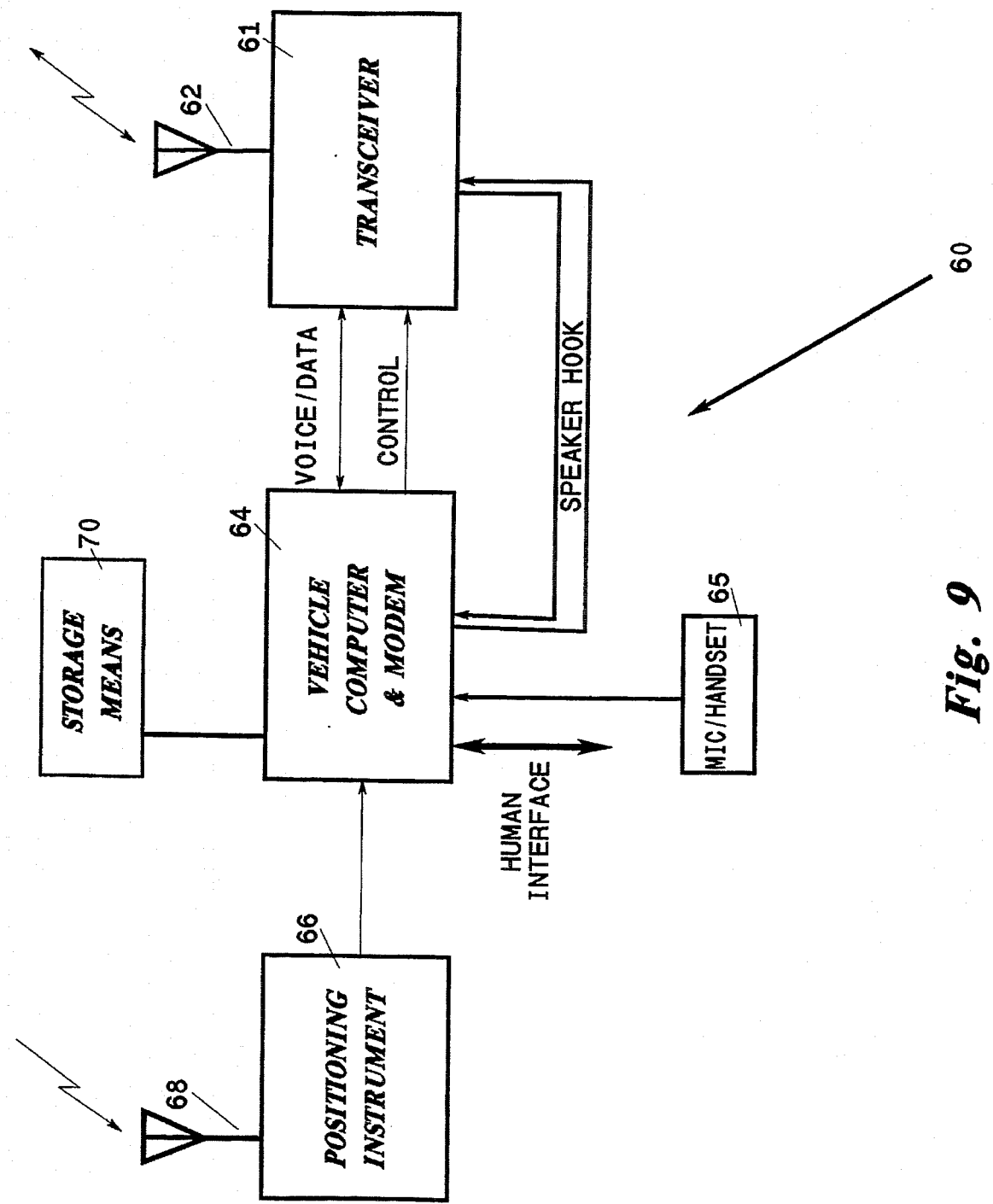
FIG. 9 is a block diagram showing the principal components of a control unit in respect of each of the remote units in accordance with a preferred embodiment of the invention for carrying out a dispatching function.

FIG. 9 shows the principal components associated with a participant allocation unit 60 located in each of the vehicles. Allocation unit 60 preferably includes a transceiver 61 coupled to an antenna 62 for effecting bi-directional communication with the transceiver 50 in the control center 37. Transceiver 61 is connected to a vehicle computer 64 coupled to a microphone/handset 65 providing a human interface between the vehicle computer 64 and the corresponding taxi driver.

A Global Positioning System 66 (GPS) or other position determining system as known in the art receives positioning data via an antenna 68. The Global Positioning System 66 is coupled to the vehicle computer 64 and functions as a positioning means for providing positioning information relative to a predetermined origin in respect of the corresponding participant. Thus, once the location of the customer is provided to the vehicle computer 64, the latter, being coupled to the Global Positioning System 66 is able to determine the relative location of the participant to the customer and thus determine the participant's priority.

Associated with the vehicle computer 64 is a storage means 70 for storing the protocol according to which priorities are assigned. Also stored in the storage means 70 are any singular areas which can affect the actual route e.g. obstructions such as rivers, road blocks and so on which result in the actual route distance being longer than it would otherwise be. As explained above, the handset 65 allows the driver to assign himself a priority outside the range of the priority scale and, by such means, to exclude himself from the process of targeting. It also includes a microphone for establishing voice contact with the control center, as well as paging means for obtaining a text message therefrom.

The system described above may include a full duplex broadcast network such that the control center does not need to await responses from all of the participants before targeting the highest priority participants. Thus, specifically, as soon as a valid response is received by the control center, the participants corresponding to the response can immediately be targeted or identified whilst informing other participants to stop transmitting indication signals or identification messages. This permits the steps of targeting and/or identifying participants to be effected more quickly. However, the invention may also be employed in a simplex (i.e. half-duplex) broadcast network, albeit at the expense of longer targeting and identification times since the control center cannot transmit to the participants until all their responses have first been received and validated.

It will be appreciated that, instead of employing a Global Positioning System, other systems for determining a participant's location can equally well be employed. For example, a route scheduler based on dead reckoning responsive to each participant's location can be used for determining a route having minimum distance. Such a route scheduler might possibly comprise sensors located at intervals along the road for sensing a passing vehicle's presence and for transmitting to the vehicle data representative of its location relative to a specified location for error correction. Typically, such a route scheduler has a memory for storing therein a scaled contour map so that an optimal route can be determined taking into consideration the nature of the terrain. Likewise, prevailing traffic conditions can be fed into the route scheduler at regular intervals of time, so that traffic jams, roadwork and so on can be considered when determining the optimal route.

In the foregoing description it has also been assumed that a single channel broadcast network is employed. However, this is by no means essential and a centralized controlled trunking system having at least two channels may equally well be employed. This permits more than one task to be handled simultaneously each on a different broadcast channel. Thus, in the case of a two channel broadcast network, for example, having first and second channels, each call message is transmitted via a broadcast control channel so as to be received by all the participants associated with the first channel. Upon determining that he has not been targeted by the control center, a participant starts to measure elapsed time and waits a predetermined elapsed time locked on to the first channel and thereafter returns to the broadcast control channel for receiving further call messages.

The period of time during which a non-targeted participant remains locked on to the first channel is of sufficient duration to allow an updated priority to be assigned to the participant. Owing to the dynamic variation in a participant's status, it may occur that, with an updated priority, a previously non-targeted participant becomes targeted in the next iteration. Thus, the period of time during which a non-targeted participant remains locked on to the first channel must further be of sufficient duration to allow a corresponding indication signal and/or identification message to be transmitted by the participant to the control center, whereby the control center may target and/or identify the participant.

Alternatively, the call message may be transmitted via a broadcast control channel so as to be received by all the participants associated with the first channel and, upon determining that he has not been targeted by the control center, a participant receives from the control center an instruction to return immediately to the broadcast control channel. This immediately frees a non-targeted participant to participate in a subsequent search strategy on the second channel relating to a different task.

According to yet another variation, an initial call message is transmitted together with the selection criteria via a broadcast control channel so as to be received by all the participants associated with the first channels. Each of the participants receiving the call message assigns to himself from the priority scale a respective priority representative of his relative suitability in accordance with the selection criteria and transmits an indication signal during a respective indication slot. Only the targeted participants switch to the first channel and subsequent call messages are transmitted only to those participants who have been previously targeted by the control center. This again frees a non-targeted participant to participate in a subsequent search strategy on the second channel relating to a different task.

It will be appreciated that whilst the invention has been described with particular application to a taxi dispatching service, the invention has more general application wherever one or a group amongst a plurality of participants is to be targeted in accordance with their respective suitabilities based on at least one selection criterion. It will further be understood that, whilst the preferred embodiment has been described for the sake of simplicity with regard to only two selection criterion (i.e. distance and waiting time), in practice a large number of selection criteria may be employed, all having different relative weights, whereby an integrated search strategy may be implemented.

It will also be understood that whilst the invention has been described with particular reference to 2 dimensional terrain, it can equally well be applied in 3 dimensional space and is thus suitable for air or space travel, as well as land and sea.

Mention should also be made of the variable parameters in association with which the protocol functions. These are generally application dependent and typically are provided with default values built into the protocol. Thus, if distance is one of the selection criteria, this fact may be represented by a default value of an associated parameter. Likewise, the lower and upper bounds of the priority scale and the priority resolution associated with each iteration in phase one can been assigned to respective parameters each having corresponding default values.

Any unassigned parameters must, of course, have values assigned thereto prior to initiation of phase one. This can be done during the initiation of the process prior to transmitting the first call message to the participants. However, in certain applications, all the parameters may have pre-assigned default values which are acceptable for the application. In this case, the call message merely starts the process enabling the participants to determine the appropriate priority scale and assign themselves respective priorities at the appropriate priority resolution; there being no need to inform any of the participants of the boundary values of the priority scale or of the priority resolution or indeed of the selection criteria.

While the invention has been described with particular reference to a wireless broadcast network, it will be appreciated that the invention is capable of much more general application. For example, hard-wired communication systems may also employ the principles of the invention in which case the indication signals need no longer be CW. In such cases the dynamic variables would generally not be position; however the system is generally applicable to systems with any set of dynamic variables.

The principles of the invention may also be used in a routing system, for example to a system which identifies buses or other vehicles which are delayed and adjusts the speed and/or location of other buses to compensate therefor. In the first (targeting) stage of this utilization of the invention, the priority would for example be based on the amount of time that a vehicle is behind schedule. Vehicles which are behind schedule more than a predetermined amount would then be targeted and identified in a second (identification) stage. Preferably, the identified bus would then be asked for its exact position.

A query would then be sent to other busses on the same bus line asking them for their positions and, optionally, where they stand in relation to their schedule. Based on this information, a control center would determine corrective action to provide improved service, which may include steps such as speeding up some buses, as for example by operating them in a skip-stop fashion, slowing some buses down, keeping some buses from leaving the terminal or adding new buses to the route, perhaps at some intermediate point on the route. Suitable instructions would, of course, be transmitted to these busses after a corrective action plan is formulated.

The principles of the invention are also applicable to a routing system for determining slow areas of traffic and rerouting traffic around such areas. In such a system a large number of participating vehicles are queried as to the delays they are experiencing. When a vehicle experiences a delay above a threshold, the position of the vehicle is determined in the second phase. It should be noted that no identification signal per se is transmitted in the second phase, instead a position signal is broadcast. Preferably, the delay is also verified by the driver of the vehicle to avoid false alarms.

Once the position of the targeted delayed vehicle is determined, a new first (targeting) stage determines those vehicles that are close to the specific delayed vehicle, and determines, by successive second stages, the extent of the delay as a function of the time of the delay. Furthermore, by making multiple queries, the traffic conditions can be estimated. Based on this information, the seriousness of the delay may be determined and corrective action, such as re-routing of other vehicles, may be started. In particular, information on the traffic conditions and the geographical extent of the delay may be transmitted to vehicles which have routing apparatus of types which are known in the art, to be used by these apparatus for determining the optimum route for the receiving vehicle.

In an alternative preferred embodiment of the invention, the first query requests responses only from vehicles which are experiencing delays greater than a given time (or which are moving at an average velocity of less than a given velocity). Those vehicles which meet the criteria then broadcast a signal in a time or time/frequency or frequency slot which is indicative of the absolute position of the vehicle. As in the previous embodiments of the invention, it is expected that more than one vehicle will broadcast in a particular slot and the system is interested, at least at this stage, only in determining if there are vehicles which are experiencing delays of a given magnitude.

Figure 10:
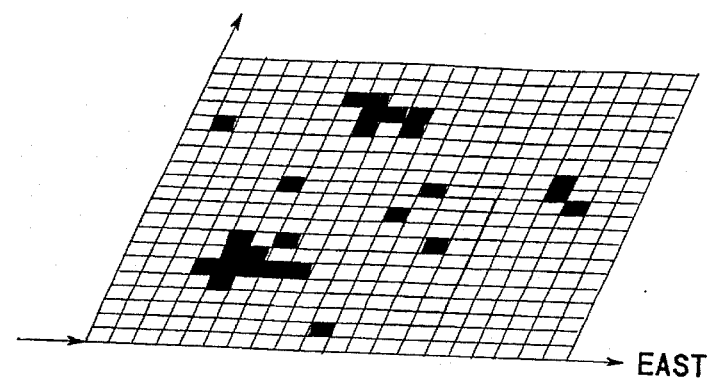
FIG. 10 shows an initial map generated in an IVHS system in accordance with a preferred embodiment of the invention.

FIG. 10 shows an initial map generated by such a method, wherein the area represented by a pixel (slot) may, for example, be of the order of 250 to 1000 meters square.

Figure 11:
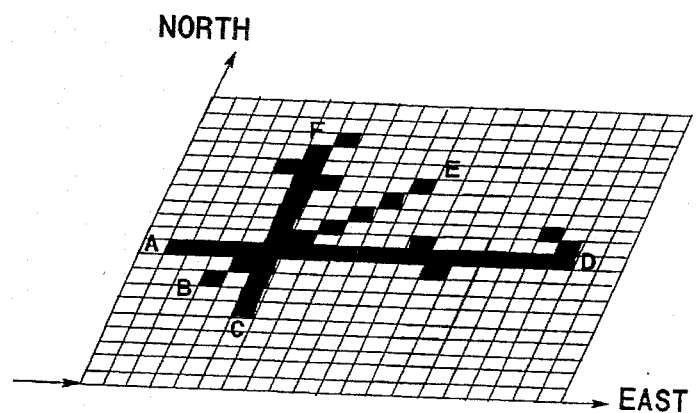
FIG. 11 shows a second, more detailed map, generated during a second iteration in an IVHS application in accordance with a preferred embodiment of the invention.

In a preferred embodiment of the invention, the system then determines, based, inter alia, on the extent of the various contiguous areas which shows positive responses, a smaller area or areas for further study. Preferably, the system then broadcasts a further query requesting those vehicles within the more restricted area which have at least a given delay (which may be the same as or different from that used in the first query) to broadcast in a position slot using a finer resolution, for example, 100 to 250 meters. Based on the responses to this query a second map such as that shown in FIG. 11 is generated. As can be seen from FIG. 11, various branches of a road network radiating from an intersection, designated as A–F in FIG. 11, can be identified. To improve the usefulness of the display, a background map, such as a road map may be displayed underlying the displays of any of FIGS. 10, 11 or 13.

Figure 12:
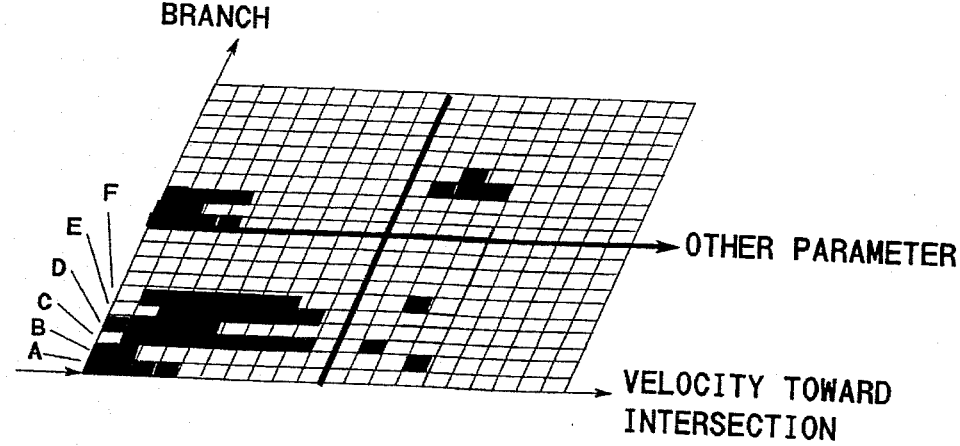
FIG. 12 shows a graph of additional information which is generated in an IVHS application in accordance with a preferred embodiment of the invention.

In the event that additional information relating to the delay is desired, further queries can be made. For example, vehicles which are traveling toward the intersection can be requested to broadcast in a slot which corresponds to the slot they are in and to their velocity toward the intersection. This allows for generation of the graph shown in the lower portion of FIG. 12. Additional slots may be used for the generation of other information regarding the responding stations. Such information may also be graphed as shown in the upper portion of FIG. 12.

Figure 13:
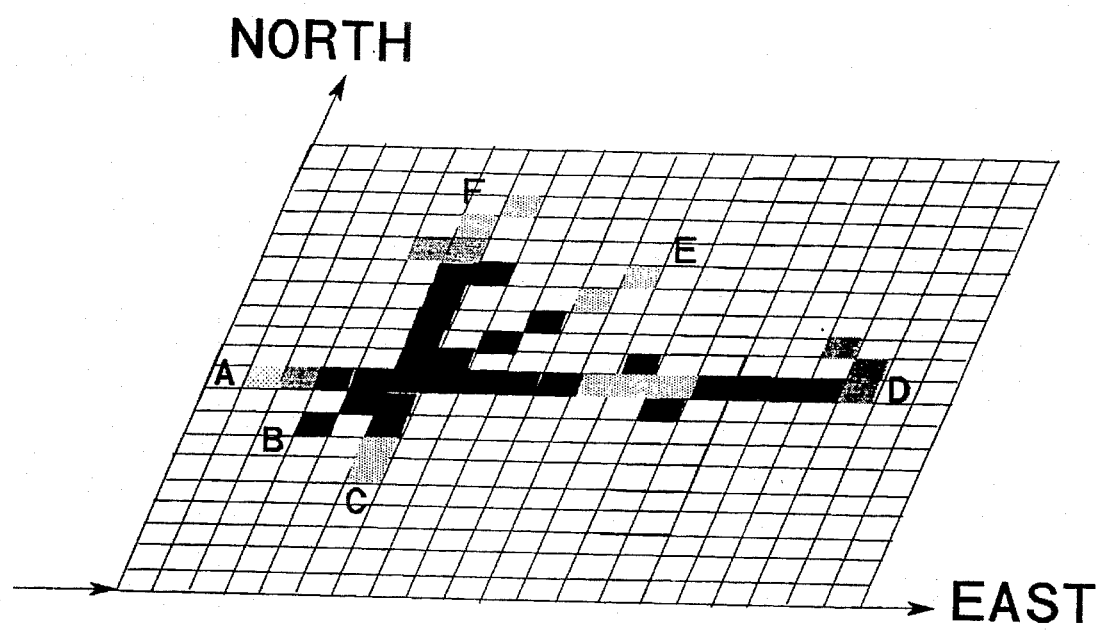
FIG. 13 shows a graph of further additional information which is generated in an IVHS application in accordance with a preferred embodiment of the invention.

Alternatively or additionally, a map which shows the average velocity of the vehicles toward the intersection as a function of the position can be generated. Such a map is shown in FIG. 13. To acquire the information needed for generating such a map, a number of queries may be made, each requesting an indication from all vehicles within the area of interest having a given average velocity toward the intersection. The responding vehicles would broadcast their indication signals in slots corresponding to their position. In the map of FIG. 13 the velocity for a given pixel is determined, for example, as the average velocity of the reporting slots for that position. In a display of the map of FIG. 13, the velocity toward the intersection can, for example, be displayed as a gray scale value or as a color, with for example red being the highest delay and blue being a minimum displayed delay.

Figure 14:
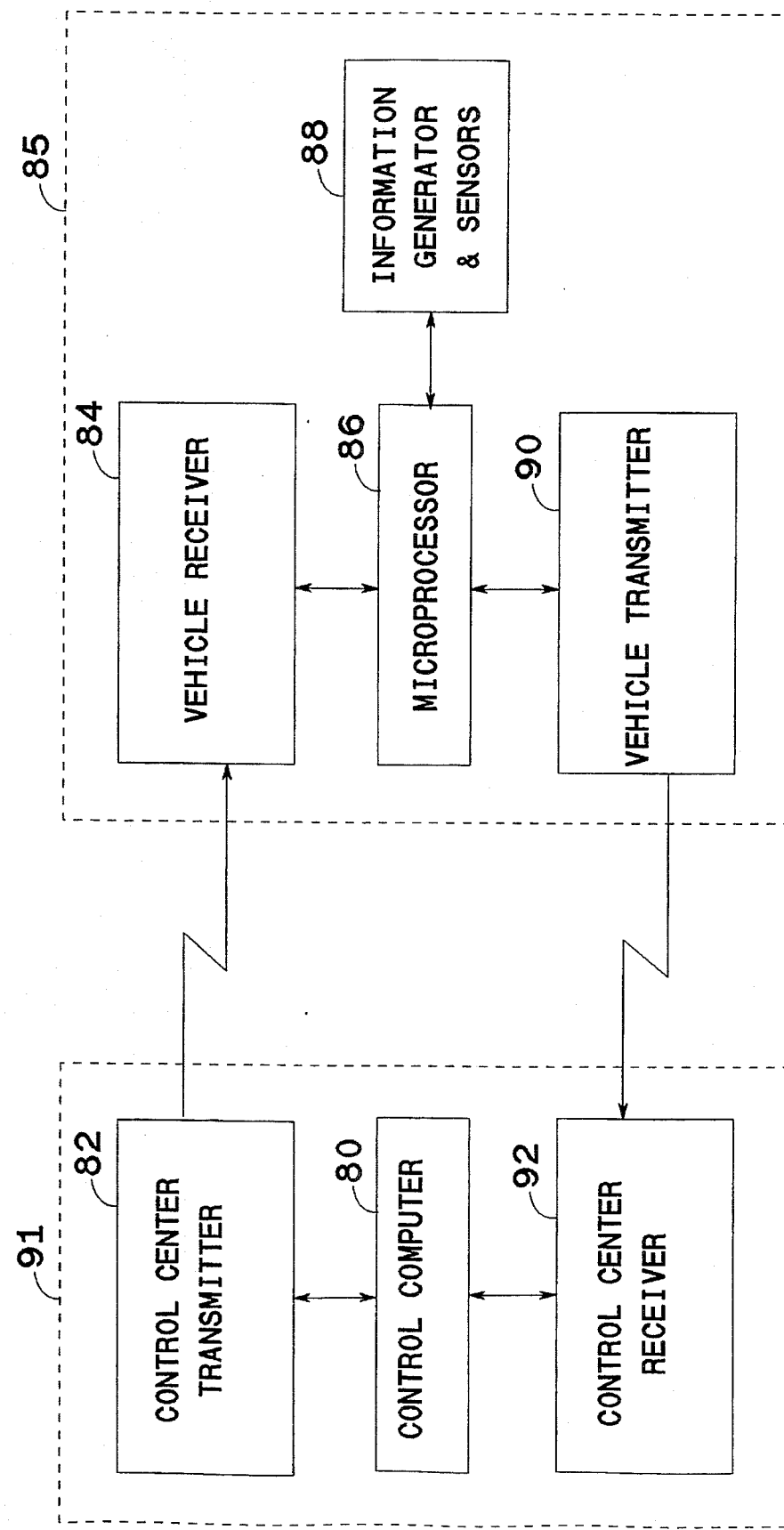
FIG. 14 is a general block diagram of a transmitter for an IVHS system in accordance with a preferred embodiment of the invention.

FIG. 14, which is a generalized block diagram for a system useful for performing the IVHS function described above, shows a base station or control center 91 having a control center transmitter 79 which broadcasts queries and optionally other signals to vehicles on command from a control computer 80. A remote vehicle 85 (only one vehicle is shown for simplicity) receives the query at a vehicle receiver 84 and transmits commands to a microprocessor 86, based on the queries it receives from the control center.

Microprocessor 86 also receives information regarding the status of the vehicle from one or more information generators and sensors indicated by reference numeral 88. This information may be sent by the sensors on a regular basis or may be sent on command from the microprocessor.

Microprocessor 86 is then operative to command vehicle transmitter 90 to transmit indication signals (or if required information bearing signals) in a suitable slot in accordance with the information received by microprocessor 86.

The indication (or other) signals are received by a control center receiver 92 and processed by receiver 92 and computer 80. While the operation and construction of the apparatus designated by reference numerals 82, 84, 86 and 90 is straightforward and needs no further explanation, the operation of receiver 92 is usefully expanded upon with reference to FIG. 15.

Generally speaking, the RF signals transmitted by the vehicle may be at any frequency. It is to be expected (both for the IVHS application and for the dispatching application described above) that there will a certain amount of frequency diversity cause by the imperfect accuracy and stability of the vehicle transmitters 90. The slots are wide enough to accommodate this diversity. However, if a receiver having a band-width consistent with the slot width is used, the dynamic range of the system will be very limited.

Furthermore, often the system utilizes very large numbers of vehicles. If too many of these vehicles (in some particular situation) transmit in the same slot, then the total power transmitted will exceed authorized ERP or dynamic range restrictions. To overcome this problem longer, lower power, pulses may be used for indication signals. Furthermore, if a single receiver is used for receiving signals for all of the slots, intermodulation effects may cause spurious signals to appear in slots for which no actual signals have been received.

These problems are substantially solved by the system shown in FIG. 15 and by certain constraints placed on the system which are not shown in FIG. 15.

With respect to excess power problems, the queries can be designed so that fewer than the total number of vehicles will respond, whenever this is possible. The power transmitted by the vehicles can be adjusted to a minimum based on either the known distance between the vehicle and the control receiver, with each vehicle transmitting just enough power so that detection of the signal by the control station is assured. A further or alternative power adjustment may be made by the vehicle transmitter based on the power received from the control station during the query. Finally, a closed loop system in which the query includes instructions as to the power levels to be used may be used. Increased pulse duration can also reduce the transmitted power for a given ratio of detection probability to false alarm probability especially in the receiver shown in FIG. 15 and described below.

Preferably, the amplitude of the signals broadcast during the time slot is shaped over the broadcast period to reduce the sidelobes of the signals and avoid false signals in adjacent frequency slots, which may be a problem when large numbers of vehicles broadcast at the same time.

Intermodulation effects can be reduced by providing multiple receivers, each covering only a portion of the frequency band. Finally the novel receiver of FIG. 15 may be used to determine the presence absence of signals in particular slots.

FIG. 15 shows a receiver system corresponding generally to reference number 92 and to a portion of computer 80 of FIG. 14. In general such a receiver is also useful for the first phase of the dispatching system described above as well as for the IVHS system.

An antenna 94 receives signals from a plurality of vehicles simultaneously and passes them to receiver and AGC 96. Receiver and AGC 96, which may be of conventional design, downconverts the received signals from RF to IF frequencies. The IF signal is digitized in an A/D convertor 98 and further down converted by a downconverter 100 to base band. It should be understood that this receiver/downconverter system does not demodulate the incoming signals, but only downconverts the RF so that the same relative frequency differences of the signals is present at the output of convertor 100 as in the incoming signals, except that the absolute frequency has been reduced to a low (base band) frequency from the RF frequency of the transmitted signal.

The base band signals are fed to a series of correlation filters 102 each of which has a very narrow bandwidth. Preferably, the frequency bandwidths of adjacent receivers 102 overlap so that the entire bandwidth of each of the slots is covered by one set of receivers 102. The output of each of the receivers is compared to a threshold 104 to determine if a signal is present at the frequency of the respective receiver 102 and the outputs of all of threshold detectors for a given slot are OR gated to determine if any signal is present in the slot. One set of receivers 102, threshold detectors 104 and an OR gate is provided for each slot and is referred to herein as a slot detector unit. Slot detector units for all of the slots feed a data processor 108 which, together with computer 80 processes the data as described above. When large numbers of vehicles are used in the system and intermodulation becomes a problem, it may be necessary to provide a plurality of front end portions of receiver 92 (the front end being defined as receiver 96, convertor 98 and converter 100), where each front end receives signals from only a portion of the entire frequency band including one or many of the slots. The function of correlation receivers 102 may also be implemented, for example, using an FFT, matched filters or other correlation receiver methods. Other methods such as energy detectors (e.g., radiometers) with or without tracking may also be used, however, they will give less optimal results.

The system may also be provided with a display 110 for displaying the data, such as the maps and graphs of FIGS. 10–13 and with a user interface 112 which is used by an operator to control both the operation of the system. The user interface also preferably controls the display and the memory to allow for the operator to review the maps previously generated or to generated new displays based on information previously received.

Information may be sent by the control center to the vehicles to enable them to minimize average travel delays. This information may consist of the above mentioned maps or of delay information at various intersections. The vehicles can then use this information to optimize their route. Alternatively, the control center may send routing information to some of the vehicles in order to equalize traffic delays. In either event, the fast response of the system a matter of seconds allows for real time supervision, adjustment and stabilization of traffic patterns.

The IVHS system described above is also useful in tracking situations such as for fleet management.

The invention has been described herein using examples in which the indication signals are transmitted in time, frequency or time and frequency slots. Other types of transmission slots are also useful in the invention such as frequency hopping and other spread-spectrum transmission slots. The term "transmission slots" as used herein includes all these types of slots.

I claim:

1. A method for receiving information from a plurality of remote stations, the stations having varying attributes related to the information, comprising the steps of:
   (a) determining, at each of a plurality of stations, of a characteristic value based on at least one of the attributes, according to a predetermined protocol for the respective station; and
   (b) transmitting, by the stations, of a non-information bearing signal in a transmission slot, wherein said slot is indicative of the determined characteristic value.

2. A method according to claim 1 wherein signals are intentionally transmitted by more than one station in a given transmission slot.

3. A method for receiving information from a plurality of remote stations, the stations having varying attributes related to the information, comprising the steps of:
   (a) determining, at each of a plurality of stations, of a characteristic value based on at least one of the attributes, according to a predetermined protocol for the respective station; and
   (b) transmitting, by the stations, of a signal in a transmission slot, wherein said slot is indicative of the determined characteristic value and wherein signals are intentionally transmitted by more than one station in a given transmission slot.

4. A method according to claim 1, wherein all of the responding stations transmit a signal at substantially the same frequency.

5. A method according to claim 2, wherein all of the responding stations transmit a signal at substantially the same frequency.

6. A method according to claim 3, wherein all of the responding stations transmit a signal at substantially the same frequency.

7. A method according to claim 1, wherein the stations transmit in a predetermined transmission channel into said transmission slots and wherein each slot represents a range of the characteristic value.

8. A method according to claim 1 wherein the characteristic value is based on a plurality of said attributes.

9. A method according to claim 7 and including the step of:
   transmitting a call requesting a response from those stations having a characteristic value within a restricted range.

10. A method according to claim 9 wherein the stations respond to the call by transmitting a signal in a transmission slot indicative of the calculated characteristic value within the restricted range of values.

11. A method according to claim 9, wherein all of the stations transmit signals at substantially the same frequency in response to the call.

12. A method according to claim 1 and including the step of:
    transmitting a further call requesting those stations having a characteristic within a narrow range to transmit an information bearing signal.

13. A method according to claim 12, wherein said information bearing signal is an identification signal and wherein identification signals from stations having the narrow band of values are transmitted during one of a plurality of slots chosen at random by each of the stations and wherein a station whose identification signal is received clearly during a slot is chosen.

14. A method according to claim 13 and including the step of:
    choosing, by a random process at the remote stations, those stations which transmit their identification signals.

15. A method according to claim 12, wherein all of the stations transmit their identification signals at substantially the same frequency.

16. A method according to claim 1 wherein said characteristic value is responsive to the average velocity of the station.

17. A method according to claim 2 wherein said characteristic value is responsive to the average velocity of the station.

18. A method according to claim 3 wherein said characteristic value is responsive to the average velocity of the station.

19. A method according to claim 1 wherein said characteristic includes the position of the station.

20. A method according to claim 2 wherein said characteristic value is responsive to the position of the station.

21. A method according to claim 3 wherein said characteristic value is responsive to the position of the station.

22. A method according to claim 1 wherein said characteristic value is responsive to the delay being experienced by the station.

23. A method according to claim 2 wherein said characteristic value is responsive to the delay being experienced by the station.

24. A method according to claim 3 wherein said characteristic value is responsive to the delay being experienced by the station.

25. A method according to claim 16 wherein the characteristic comprises at least one element additional to the average velocity or delay experienced by the station and including the step of:

transmitting at least one additional call requesting a response from those stations having a value for said element within a restricted range of values.

26. A method according to claim 22 wherein the characteristic comprises at least one element additional to the average velocity or delay experienced by the station and including the step of:

transmitting at least one additional call requesting a response from those stations having a value for said element within a restricted range of values.

27. A method according to claim 25 wherein the element comprises the position of the station.

28. A method according to claim 1, wherein steps (a) and (b) are performed in response to a call transmitted by a control station.

29. A method according to claim 2, wherein steps (a) and (b) are performed in response to a call transmitted by a control station.

30. A method according to claim 3, wherein steps (a) and (b) are performed in response to a call transmitted by a control station.

31. Apparatus for receiving information from a plurality of remote stations, the stations having varying attributes related to the information, comprising:

(a) a first transmitter which transmits a call to a plurality of said remote stations;

(b) determining apparatus at each of the stations, which determines a characteristic of the station based on a predetermined protocol in response to the call; and (c) a plurality of second transmitters each associated with one of the remote stations which transmits a non-information bearing signal in a transmission slot which is indicative of the determined characteristic.

32. Apparatus according to claim 31 wherein more than one of the plurality of second transmitters transmits in the same slot.

33. Apparatus according to claim 31 wherein all of the second transmitters transmit at substantially the same frequency.

34. Apparatus according to claim 31, wherein the stations respond to the call in a predetermined channel divided into said transmission slots and wherein each slot represents a range of values of the characteristic.

35. Apparatus according to claim 31 and including a controller for causing the first transmitter to transmit at least one additional call requesting a response from those stations having a characteristic within a restricted range of values.

36. Apparatus according to claim 35 wherein the stations include a second controller which causes the second transmitters to transmit a signal, in response to the additional call in a transmission slot, said slot being indicative of the characteristic within the restricted range of values.

37. Apparatus according to claim 36, wherein all of second transmitters transmit at substantially the same frequency in response to the additional call.

38. Apparatus according to claim 31 wherein the controller includes circuitry which causes the first transmitter to transmit a further call requesting those stations having a characteristic within a narrow range to transmit an information bearing signal.

39. Apparatus according to claim 38 and comprising:

means associated with each of the stations for causing the second transmitter associated with a station to transmit an identification signal during one of a plurality of slots chosen at random by the station; and means for choosing one of the stations whose identification signal is received clearly in a slot.

40. Apparatus according to claim 39 and including:

circuitry which chooses, by a random process at the remote stations, those stations which transmit their identification signals.

* * * * *